(12) United States Patent
Park

(10) Patent No.: US 12,372,738 B2
(45) Date of Patent: *Jul. 29, 2025

(54) LENS ASSEMBLY

(71) Applicant: LG INNOTEK CO., LTD., Seoul (KR)

(72) Inventor: Sung June Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,187

(22) Filed: Jul. 23, 2024

(65) Prior Publication Data

US 2024/0377609 A1 Nov. 14, 2024

Related U.S. Application Data

(63) Continuation of application No. 17/044,215, filed as application No. PCT/KR2019/004464 on Apr. 12, 2019, now Pat. No. 12,066,690.

(30) Foreign Application Priority Data

Apr. 12, 2018 (KR) .................. 10-2018-0042743

(51) Int. Cl.
*G02B 7/09* (2021.01)
*G02B 7/10* (2021.01)
(Continued)

(52) U.S. Cl.
CPC ................. *G02B 7/09* (2013.01); *G02B 7/10* (2013.01); *G03B 5/00* (2013.01); *G03B 13/36* (2013.01);
(Continued)

(58) Field of Classification Search
None
See application file for complete search history.

(56) References Cited

U.S. PATENT DOCUMENTS 5,515,210 A 5/1996 Devenyi
5,937,215 A 8/1999 Mogamiya
(Continued)

FOREIGN PATENT DOCUMENTS

CN 1395145 A 2/2003
CN 101324693 A 12/2008
(Continued)

OTHER PUBLICATIONS

International Search Report in International Application No. PCT/KR2019/004464, filed Apr. 12, 2019.
(Continued)

*Primary Examiner* — Rodney E Fuller
(74) *Attorney, Agent, or Firm* — Saliwanchik, Lloyd & Eisenschenk

(57) ABSTRACT

A lens assembly according to an embodiment may comprise: a first pin; a first housing which moves along the first pin; a first lens group arranged in the first housing; and a first wheel which is arranged in the first housing and moves along the first pin. The first wheel may include a first rotation shaft coupled to the first housing, and a first rotation part which rotates about the first rotation shaft. The first rotation part may include a groove corresponding to the first pin, wherein the maximum depth of the groove may be less than one-half the maximum thickness of the first pin in a direction perpendicular to the first rotation shaft.

20 Claims, 21 Drawing Sheets

(51) Int. Cl.
  *G03B 5/00* (2021.01)
  *G03B 13/36* (2021.01)
  *G02B 13/18* (2006.01)

(52) U.S. Cl.
  CPC ...... *G02B 13/18* (2013.01); *G03B 2205/0046* (2013.01)

(56) References Cited

U.S. PATENT DOCUMENTS

| | | | |
|---|---|---|---|
| 7,826,734 | B2 | 11/2010 | Shirono et al. |
| 8,289,626 | B2 | 10/2012 | Nomura |
| 8,503,105 | B2 | 8/2013 | Huang et al. |
| 8,625,212 | B2 | 1/2014 | Henry |
| 9,219,429 | B2 | 12/2015 | Yamanaka et al. |
| 11,425,288 | B2 | 8/2022 | Park |
| 12,066,690 | B2 * | 8/2024 | Park ................. G03B 13/36 |
| 2006/0221472 | A1 | 10/2006 | Manabe et al. |
| 2007/0097524 | A1 | 5/2007 | Harada et al. |
| 2007/0217775 | A1 | 9/2007 | Shirono et al. |
| 2010/0086291 | A1 | 4/2010 | Kim et al. |
| 2011/0199675 | A1 | 8/2011 | Henry |
| 2012/0063007 | A1 | 3/2012 | Imagawa et al. |

FOREIGN PATENT DOCUMENTS

| | | |
|---|---|---|
| CN | 101943788 A | 1/2011 |
| CN | 102213813 A | 10/2011 |
| CN | 102401970 A | 4/2012 |
| CN | 102621656 A | 8/2012 |
| CN | 105954962 A | 9/2016 |
| JP | 10-161001 A | 6/1998 |
| JP | 2010-112978 A | 5/2010 |
| JP | 2014-212682 A | 11/2014 |
| JP | 2017-201192 A | 11/2017 |
| KR | 10-2006-0106705 A | 10/2006 |
| KR | 10-2007-0045959 A | 5/2007 |
| KR | 10-2007-0050491 A | 5/2007 |
| KR | 10-0890590 B1 | 3/2009 |
| KR | 10-1779817 B1 | 9/2017 |

OTHER PUBLICATIONS

Office Action dated Apr. 12, 2022 in Chinese Application No. 201980025387.7.
Office Action dated Jun. 16, 2023 in Korean Application No. 10-2018-0042743.
Office Action dated Sep. 1, 2023 in U.S. Appl. No. 17/044,215.
Notice of Allowance dated Apr. 23, 2024 in U.S. Appl. No. 17/044,215.

\* cited by examiner

LENS ASSEMBLY

CROSS-REFERENCE TO RELATED APPLICATIONS

This application is a continuation of U.S. application Ser. No. 17/044,215, filed Sep. 30, 2020; which is the U.S. national stage application of International Patent Application No. PCT/KR2019/004464, filed Apr. 12, 2019, which claims the benefit under 35 U.S.C. § 119 of Korean Application No. 10-2018-0042743, filed Apr. 12, 2018, the disclosures of each of which are incorporated herein by reference in their entirety.

TECHNICAL FIELD

The embodiment relates to a lens assembly, a lens driving device, and a camera module including the same.

BACKGROUND ART

The camera module performs a function of photographing a subject and storing it as an image or video, and is installed in mobile terminals such as mobile phones, laptops, drones, and vehicles.

On the other hand, portable devices such as smartphones, tablet PCs, and laptops have built-in ultra-small camera modules, and these camera modules automatically adjust the distance between the image sensor and the lens to align the focal length of the lens with an autofocus function.

Recently, a camera module may perform a zooming function of zooming up or zooming out of photographing by increasing or decreasing the magnification of a distant subject through a zoom lens.

On the other hand, friction torque is being generated during lens movement using lens driving device for zooming function in camera module, and this friction torque is causing technical problems such as reduction of drive force, increase of power consumption or deterioration of control characteristics.

In particular, alignments between the lenses must be well matched, especially in order to produce the best optical properties in the camera module. However, if a decent or tilt occurs, which causes the center of the spherical surface between lenses to deviate from the optical axis, the angle of picture changes or deviates from focus, which adversely affects image quality or resolution.

On the other hand, in the case of increasing the separation in the moving area to reduce frictional torque resistance when moving the lens for the zooming function in the camera module, there is technical contradiction in that the lens decent or lens tilting arises while zoom moving or reversing of the zoom movement.

In addition, there is a problem in that it is difficult to implement a zooming function applied in a general large camera because there is a space limitation for zooming because the compact camera module has a size limitation.

In addition, although it is important to sense the position of the lens that is moved during zooming in the camera module, there is a technical problem in that the reliability of measuring the position of the lens that is moved during zooming is lowered in the related art.

On the other hand, the contents described in the item merely provides background information on the embodiment and does not constitute any prior art.

DISCLOSURE

Technical Problem

One of the technical problems of the embodiment is to provide a lens assembly, a lens driving device, and a camera module including the same that can inhibit occurrence of friction torque when a lens is moved through zooming in a camera module.

In addition, one of the technical problems of the embodiment is to provide a lens assembly, a lens driving device, and a camera module including the same that can inhibit the occurrence of lens decenter or lens tilt when the lens is moved through zooming in the camera module.

In addition, one of the technical problems of the embodiment is to provide a lens assembly having a structure capable of smoothly performing a zooming function even in a very small and compact camera module, a lens driving device, and a camera module including the same.

In addition, one of the technical problems of the embodiment is to provide a lens assembly, a lens driving device, and a camera module including the same that can solve the technical problem that the reliability of measuring the position of a lens moving when zooming in the camera module is lowered.

The technical problem of the embodiment is not limited to that described in this item, and includes what can be recognized from the entire description of the invention.

Technical Solution

The lens assembly according to the embodiment includes a first pin; a first housing moving along the first pin; a first lens group disposed in the first housing; and a first wheel disposed on the first housing and moving along the first pin.

The first wheel may include a first rotating shaft coupled to the first housing and a first rotation part rotating about the first rotating shaft.

The first rotation part includes a groove corresponding to the first pin, and a maximum depth of the groove may be less than ½ of a maximum thickness of the first pin in a direction perpendicular to the first rotating shaft.

For example, referring to FIG. 11A, the first-first wheel 117a may be disposed under the first pin 51, and an upper end 117T of the first rotation part 117a2 may be positioned lower than the horizontal central axis 51C of the first pin 51. For example, the upper end 117T of the first rotation part may be positioned lower than the curved point I of the first pin 51.

Through this, the first rotation part 117a2 includes a groove 117S corresponding to the first pin 51, and the maximum depth of the groove may be less than ½ of the diameter 2R, which is a maximum thickness of the first pin in a direction perpendicular to the first rotation shaft.

Accordingly, the upper end 117T of the first rotation part 117a2 may be positioned lower than the horizontal central axis 51C of the first pin 51.

According to the embodiment, the first pin 51 is stably disposed in the curved groove 117S of the first rotating part 117a2, and the gap between the first rotating part 117a2 and the first pin 51 is almost eliminated, and the upper end 117T of the first rotating part may be disposed lower than the horizontal central axis of the first pin 51. Through this, according to the embodiment, by eliminating friction between the sidewall of the first rotating part 117a2 and the first pin 51, there are technical effects that a generation of vibration can be minimized during zooming, thereby inhibiting the occurrence of lens decent or lens tilt.

In addition, according to an embodiment, when zooming, by dispersing contact resistance by making surface contact S between the first rotation part 117a2 and the first pin 51, there is a technical effect that the embodiment can significantly improve image quality or resolution by inhibiting the occurrence of decent or lens tilt.

In an embodiment, the first rotating shaft 117a1 of the first wheel may be fixed to the first housing, and the first rotation part 117a2 may be rotated.

In addition, the first rotation part 117a2 of the first wheel 117 and the first rotating shaft 117a1 may be integrally formed and rotated together.

In addition, the first rotation shaft may be disposed in a hole formed in the first housing.

In addition, the embodiment may further include a bushing between the first rotation shaft 117a1 of the first wheel and the first housing.

The bushing may be disposed on one of the first housing and the first rotation shaft and may be made of a metal material.

The groove of the first rotation part and a surface corresponding to the groove of the first pin may have a corresponding shape. The corresponding shape may be a curved surface.

In addition, the embodiment may further include a case in which the first pin is disposed; a first coil unit disposed in the case; and a driving magnet facing the first coil unit and disposed in the first housing.

In addition, the lens assembly according to another embodiment, including a pin; and a mover including a lens group and a wheel, wherein the wheel moves along the pin, and the wheel includes a rotation shaft and a rotation part rotating about the rotation shaft. And the rotation part of the wheel may be parallel and may don't overlap with an imaginary line passing through the center of the pin.

In addition, a lens assembly according to another embodiment may include a first pin; a second pin disposed to be spaced apart from the first pin; a first housing moving along the first pin and the second pin; a first lens group disposed in the first housing; a first wheel disposed on the first housing and disposed on the first pin; and a second wheel disposed on the first housing and disposed on the second pin.

The first wheel includes a first rotation shaft coupled to the first housing and a first rotation part that contacts and rotates with the first pin about the first rotation shaft, and the first rotation shaft of the first pin may be parallel and may not overlap with the imaginary line 51C including the diameter of the first pin.

More specifically, the first rotation part may include a groove corresponding to the first pin, and the maximum depth of the groove may be less than ½ of the maximum thickness of the first pin in a direction perpendicular to the first rotation shaft.

Through this, the upper end of the rotation part may be parallel to the first rotation shaft and disposed lower than the imaginary line 51C passing through the center of the first pin so as not to overlap the imaginary line.

For example, referring to FIG. 11A, the first-first wheel 117a may be disposed under the first pin 51, and an upper end 117T of the first rotation part 117a2 may be positioned lower than the horizontal central axis 51C of the first pin 51. For example, the upper end 117T of the first rotation part may be positioned lower than the curved point I of the first pin 51.

Through this, the first rotation part 117a2 includes a groove 117S corresponding to the first pin 51, and the maximum depth of the groove may be less than ½ of the diameter 2R, which is a maximum thickness of the first pin in a direction perpendicular to the first rotation shaft.

Through this, the upper end of the rotation part may be parallel to the first rotation shaft and disposed lower than an imaginary line passing through the center of the first pin so as not to overlap the imaginary line 51C.

In addition, the upper end 117T of the first rotation part 117a2 may be positioned lower than the horizontal central axis 51C of the first pin 51.

According to the embodiment, the first pin 51 is stably disposed in the curved groove 117S of the first rotating part 117a2, and the gap between the first rotating part 117a2 and the first pin 51 is almost eliminated, and the upper end 117T of the first rotating part may be disposed lower than the horizontal central axis of the first pin 51. Through this, according to the embodiment, by eliminating friction between the sidewall of the first rotating part 117a2 and the first pin 51, there are technical effects that a generation of vibration can be minimized during zooming, thereby inhibiting the occurrence of lens decent or lens tilt.

In addition, according to an embodiment, when zooming, by dispersing contact resistance by making surface contact S between the first rotation part 117a2 and the first pin 51, there is a technical effect that the embodiment can significantly improve image quality or resolution by inhibiting the occurrence of decent or lens tilt.

In addition, an embodiment includes a third pin disposed to be spaced apart from the first pin and the second pin; a fourth pin disposed to be spaced apart from the first pin to the third pin; a second housing moving along the third pin and the fourth pin; a second lens group disposed in the second housing; a third wheel disposed on the second housing and disposed on the third pin; and a fourth wheel disposed on the second housing and disposed on the fourth pin.

The third wheel includes a second rotation shaft coupled to the second housing and a second rotation part rotating in contact with the third pin about the second rotation shaft, and the second rotation shaft of the third pin may be parallel and may not overlap with an imaginary line including the diameter of the third pin.

In addition, the first housing may include a first groove disposed at a position corresponding to the third pin, and the second housing may include a second groove disposed at a position corresponding to the first pin.

In addition, an embodiment includes a first driving magnet disposed in the first housing and disposed between the first pin and the second pin; and a second driving magnet disposed in the second housing and disposed between the third pin and the fourth pin.

In addition, a lens assembly according to another embodiment includes a first lens group 114 and a first housing 112 that is coupled to and moved with the first lens group 114. And the first housing 112 includes a first wheel 117 for moving the first lens group 114. The first wheel 117 may include a first rotation shaft 117a1 and a first rotation part 117a2 rotating about the first rotation shaft 117a1. The first rotation part 117a2 may include a curved groove 117S.

In addition, a lens driving device according to another embodiment includes a case 20; a first housing 112 moving on the case 20 including the first lens group 114. The first housing 112 includes a first wheel 117 for moving the first lens group 114. And the first wheel 117 includes a first rotation shaft 117a1 and a first rotating portion (117a2) that rotates around the first rotation shaft 117a1. The first housing 112 may include a first sensing magnet 128 on one side. The case 20 may include a first position sensor 118 on a bottom surface. The first sensing magnet 128 and the first position sensor 118 may be vertically overlapped In addition, the camera module 100 according to the embodiment may include an image sensor unit 210 disposed at one side of the lens driving device and the case 20.

Advantageous Effects

The lens assembly, the lens driving device, and the camera module including the same according to the embodiment have a technical effect capable of solving the problem of generating a friction torque during zooming.

For example, according to the embodiment, there are technical effects such as improvement of driving force, reduction of power consumption, and improvement of control characteristics by inhibiting occurrence of friction torque during zooming.

In addition, according to the embodiment, there is a technical effect of solving the problem of occurrence of lens decenter or lens tilt during zooming.

For example, according to the embodiment, when zooming, the tolerance of the moving contact part is significantly reduced, thereby minimizing friction torque, while inhibiting the occurrence of lens decent or lens tilt, significantly improving image quality or resolution.

In addition, according to the embodiment, there is a technical effect that the zooming function can be smoothly performed even in a compact camera module.

For example, according to an embodiment, a compact camera module can be implemented by arranging a position sensor and a hall sensor in one stroke section to reduce an area occupied by the position sensor.

In addition, according to the embodiment, since the position sensor and the hall sensor are mounted in one stroke section, the circuit board area can be minimized.

Accordingly, since the circuit board does not have to be located under the lens part, which has the greatest influence on the thickness dimension of the camera module product, there is an effect of reducing the thickness of the camera module, thereby implementing a compact camera module.

In addition, according to the embodiment, there is an effect of improving the reliability of measuring the position of a lens moving when zooming in the camera module.

For example, according to the embodiment, the position sensor and the Hall sensor are arranged to overlap or be adjacent to each other between the top and bottom in the stroke section while placing the position sensor and the hall sensor in one stroke section. By securing reliable location data, it is possible to improve the linearity of data reliability according to location.

MODE FOR INVENTION

Hereinafter, embodiments will be described in detail with reference to the accompanying drawings.

On the other hand, in the description of the embodiment, in the case of being described as being formed in "top/bottom" or "above/below" of each element, includes both components in direct contact with each other or in which one or more other components formed indirectly between the two components. In addition, when expressed as "up/down"

or "above/below", the meaning may include not only the upward direction but also the downward direction.

In addition, relational terms such as "upper/upper portion/above" and "lower/lower portion/below" used hereinafter may not require or imply any physical or logical relationship or order between such components or elements. It may be used to distinguish one component or element from another component or element.

In addition, in the description of the embodiment, terms such as "first" and "second" may be used to describe various elements, but these terms are used for the purpose of distinguishing one element from other elements. In addition, terms specially defined in consideration of the configuration and operation of the embodiments are only for describing the embodiments, and do not limit the scope of the embodiments.

EXAMPLE

Figure 1:
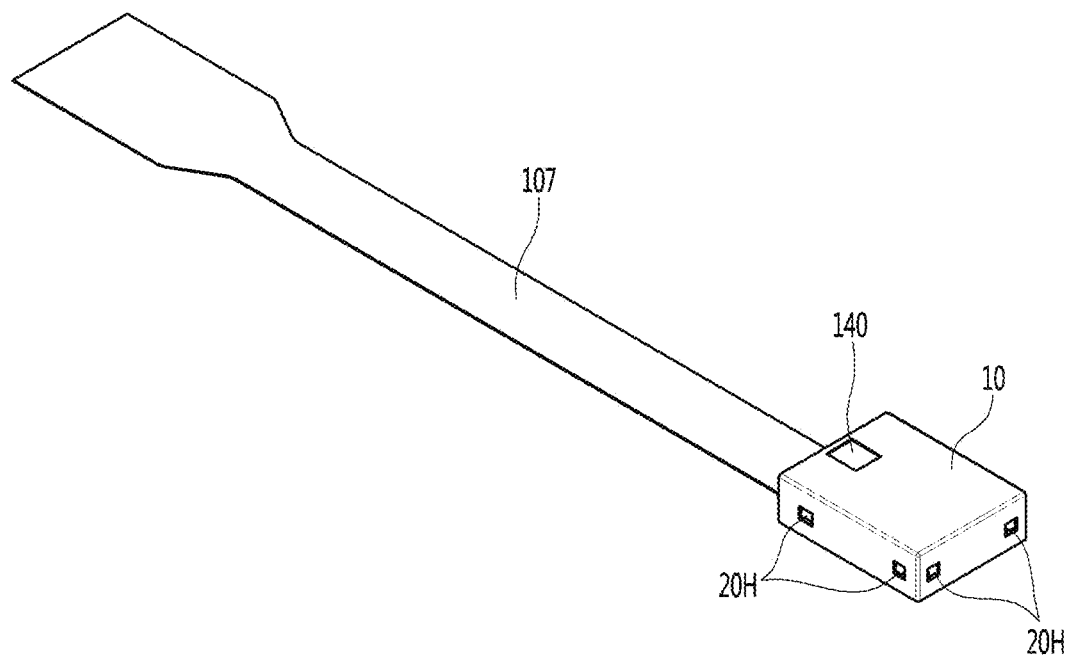
FIG. 1 is a perspective view of a camera module according to an embodiment.
Figure 2:
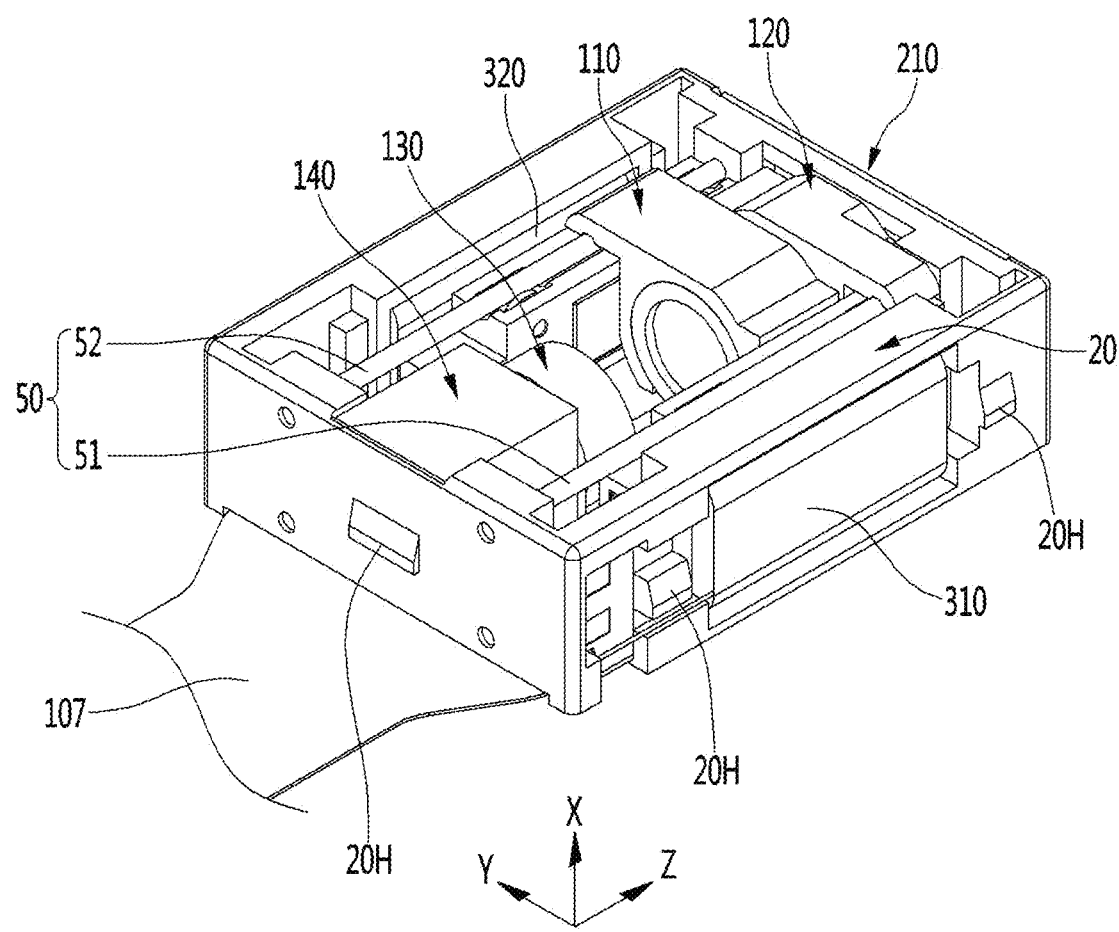
FIG. 2 is a perspective view of the camera module while a cover removed from the camera module according to the embodiment shown in FIG. 1.

FIG. 1 is a perspective view of a camera module 100 according to an embodiment, and FIG. 2 is a perspective view with a cover 10 removed from the camera module 100 according to the embodiment shown in FIG. 1.

First, referring mainly to FIG. 1, in the camera module 100 according to the embodiment, various optical systems, for example, a prism 140 and a lens group are disposed on a predetermined case 20 (see FIG. 2), and the cover 10 is coupled through a hook 20H of case 20. The case 20 may also be referred to as a mount.

The cover 10 is coupled to the case 20 and covers a component accommodated in the case 20 to protect the components of the camera module. The case 20 may be referred to as a base.

The cover 10 may be fitted with the case 20 in shape, or may be coupled by an adhesive. For example, a hook 20H may protrude from the side of the case 20, and the cover 10 has a hole formed at a position corresponding to the hook H, and the hook of the case 20 is mounted in the hole of the cover 10 so that the cover 10 and the case 20 may be coupled. In addition, the cover 10 may be stably coupled to the case 20 using an adhesive.

In addition, a circuit board 107 may be disposed under the case 20 to be electrically connected to lens driving units inside the case 20.

Next, referring to FIG. 2, in the camera module 100 according to the embodiment, an optical system and a lens driver may be disposed in the case 20. For example, the camera module 100 according to the embodiment may include at least one or more of a first lens assembly 110, a second lens assembly 120, a third lens group 130, a prism 140, a first driving unit 310, the second driving unit 320, the pin 50, and the image sensor unit 210.

The first lens assembly 110, the second lens assembly 120, the third lens group 130, the prism 140, the image sensor unit 210, and the like may be classified as an optical system.

Further, the first driving unit 310, the second driving unit 320, and the pin 50 may be classified as a lens driving unit, and the first lens assembly 110 and the second lens assembly 120 also function as a lens driving unit. The first driving unit 310 and the second driving unit 320 may be a coil driving unit, but are not limited thereto.

The pin 50 may perform a guide function of the lens assembly to be moved, and the pin 50 may be referred to as a rod or the like, and may be provided in singular or plural. For example, the pin 50 may include a first pin 51 and a second pin 52, but is not limited thereto.

In the axial direction shown in FIG. 2, the Z-axis means an optical axis direction or a direction parallel thereto. The Y-axis means a direction perpendicular to the Z-axis on the ground (YZ plane). The X-axis means the direction perpendicular to the ground.

In the embodiment, the prism 140 converts incident light into parallel light. For example, the prism 140 changes the optical path of the incident light to an optical axis Z parallel to the central axis of the lens group to change the incident light into parallel light. Thereafter, the parallel light passes through the third lens group 130, the first lens assembly 110, and the second lens assembly 120, and enters the image sensor unit 210 to capture an image.

Hereinafter, in the description of the embodiment, the case where there are two moving lens groups is described, but is not limited thereto, and the number of moving lens groups may be three, four, or five or more. In addition, the optical axis direction Z refers to a direction in which the lens groups are aligned or parallel to.

The camera module according to the embodiment may perform a zooming function. For example, in the embodiment, the first lens assembly 110 and the second lens assembly 120 are moving lenses that move through the first driving unit 310, the second driving unit 320, and the pin 50 and the third lens group 130 may be a fixed lens.

For example, in an embodiment, the first lens assembly 110 and the second lens assembly 120 may include a moving lens group, and the third lens group 130 may be a fixed lens group.

The third lens group 130 may perform a function of a focator for forming parallel light at a specific position.

In addition, the first lens assembly 110 may perform a variable function of re-forming an image formed by the third lens group 130, which is a condenser, to another location. On the other hand, in the first lens assembly 110, the magnification change may be large when the distance to the subject or the image distance changes significantly.

On the other hand, an image position of the image in the first lens assembly 110, which is a variable factor, may be slightly different depending on the location.

Accordingly, the second lens assembly 120 may perform a position compensation function for an image formed by the variable power. For example, the second lens assembly 120 functions as a compensator that performs a role of accurately forming an image formed by the first lens assembly 110, which is a variable factor, at the position of the actual image sensor unit 210.

Hereinafter, features of the camera module according to the embodiment will be described in detail with reference to FIGS. 3A to 5B.

Figure 3A:
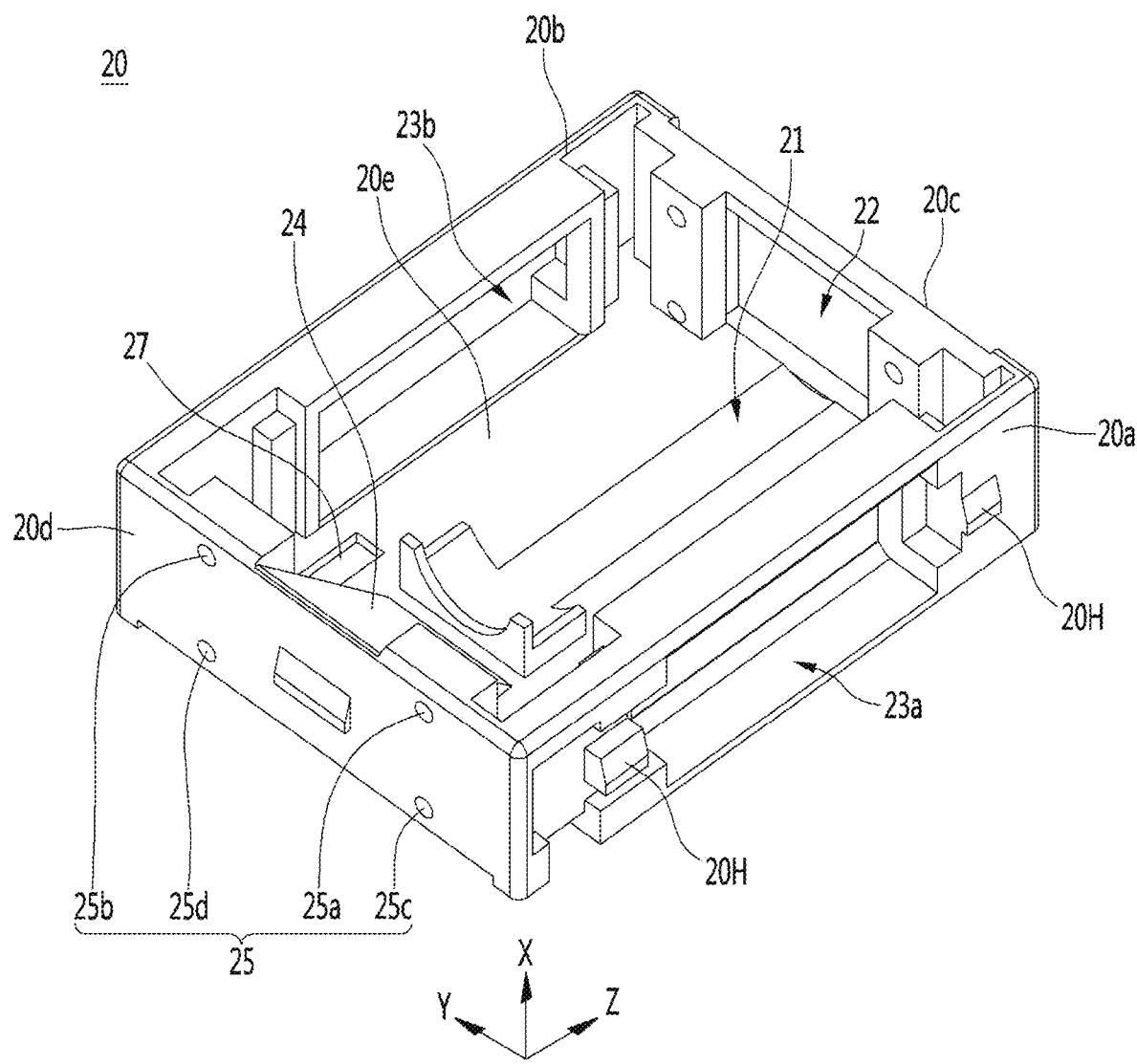
FIG. 3A is a perspective view of a case in the camera module according to the embodiment shown in FIG. 2.

First, FIG. 3A is a perspective view of a case 20 in the camera module according to the embodiment shown in FIG. 2. The case 20 may have a rectangular parallelepiped shape, and may include four side surfaces and a bottom surface 20e. For example, the case 20 may include first to fourth side surfaces 20a, 20b, 20c, and 20d. The first side 20a, the second side 20b, and the third side 20c and the fourth side surface 20d may face each other.

A hook 20H is formed on at least one side of the case 20 to be coupled to a hole of the cover 10.

In addition, the first guide groove 112G in which the first lens assembly 110, the second lens assembly 120, and the third lens group 130 are located is located on the bottom surface 20e of the case 20. The first guide groove 112G may be concave downward according to the outer circumference shape of the lens, but is not limited thereto.

In addition, a first opening 23a and a second opening 23b in which the first driving unit 310 and the second driving unit 320 are disposed on the first side surface 20a and the second side surface 20b of the case 20, respectively. In addition, a third opening 22 in which the image sensor unit 210 is disposed may be formed in the third side surface 20c of the case 20.

In addition, a single or a plurality of fourth openings 27 through which the circuit board 107 is exposed may be formed on the bottom surface of the case 20.

In addition, a single or a plurality of coupling holes 25 to which the pin 50 are coupled may be formed in the third side surface 20c of the case 20 and the fourth side surface 20d facing the same. For example, a first coupling hole 25a, a second coupling hole 25b, a third coupling hole 25c, and a fourth coupling hole 25d may be formed on the third side 20c and fourth side 20d and may be coupled the first fin 51, the second fin 52, the third fin 53, and the fourth fin 54 respectively.

In addition, a prism mounting portion 24 on which the prism 140 may be disposed may be formed inside the fourth side surface 20d of the case 20.

The material of the case 20 may be formed of at least one of plastic, glass-based epoxy, polycarbonate, metal, or composite material.

Figure 3B:
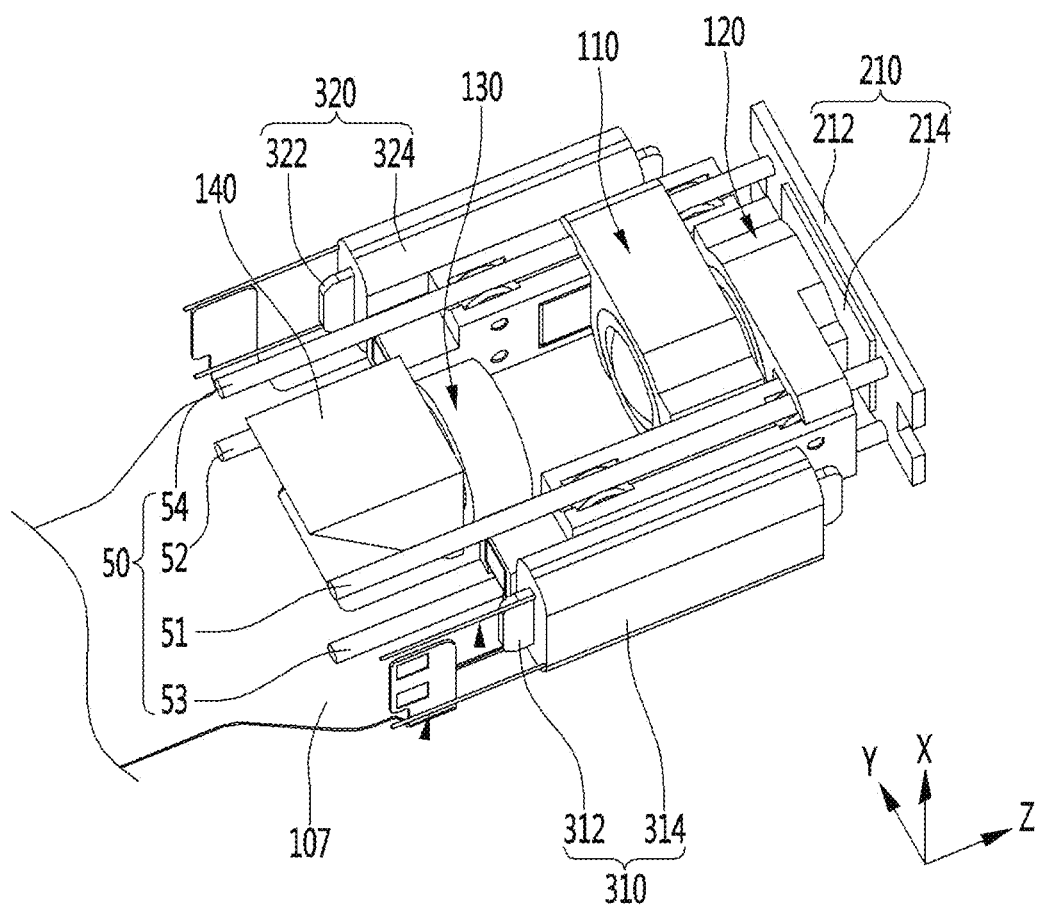
FIG. 3B is a perspective view with a case removed from the camera module according to the embodiment shown in FIG. 2.

Next, FIG. 3B is a perspective view showing the case 20 from which the case 20 is removed from the camera module according to the embodiment illustrated in FIG. 2, and shows an optical system and a lens driver.

In an embodiment, the lens driving device may include a mover and a fixing part. The mover is a concept corresponding to a fixed part and may be referred to as a moving part. For example, the mover may mean a lens assembly that is moved by a rolling motion of a wheel. On the other hand, the fixing part may mean a case, a pin, or the like that is not moved.

The camera module according to the embodiment may include an optical system such as the prism 140, the first lens assembly 110, the second lens assembly 120, the third lens group 130, and the image sensor unit 210 on the case 20. In addition, the camera module of the embodiment may include a lens driving unit such as a first driving unit 310, a second driving unit 320, and a pin 50. The first lens assembly 110 and the second lens assembly 120 may also perform a lens driving function.

The pin 50 may include first to fourth pins 51, 52, 53, and 54, and the first to fourth pins 51, 52, 53, and 54 are each coupled to the holes to the fourth coupling holes 25a, 25b, 25c, and 25d (refer to FIG. 3A) to function as a movement guide of the first lens assembly 110 and the second lens assembly 120. The pin 50 may be formed of at least one of plastic, glass-based epoxy, polycarbonate, metal, or composite material.

The first driving unit 310 may be a coil driving unit, and the first coil 314 may be wound around a first core 312 such as an iron core. In addition, the second driving unit 320 may also be a coil driving unit in which the second coil 324 is wound around a second core 322 such as an iron core.

First, the prism 140 changes the optical path of the incident light to an optical axis parallel to the central axis Z of the lens group to change the incident light into parallel light. Thereafter, the parallel light may pass through the third lens group 130, the first lens assembly 110, and the second lens assembly 120 to be captured by the image sensor unit 210.

The prism 140 may be an optical member having a triangular column shape. In addition, in the embodiment, a reflector or a reflecting mirror may be used instead of or in addition to the prism 140.

In addition, in the embodiment, when the image sensor unit 210 is not disposed in a direction perpendicular to the optical axis, an additional prism (not shown) may be provided so that light that has passed through the lens group is captured by the image sensor unit 210.

In an embodiment, the image sensor unit 210 may be disposed perpendicular to the optical axis direction of the parallel light. The image sensor unit 210 may include a solid-state imaging device 214 disposed on the second circuit board 212. For example, the image sensor unit 210 may include a Charge Coupled Device (CCD) image sensor or a Complementary Metal-Oxide-Semiconductor (CMOS) image sensor.

Figure 4A:
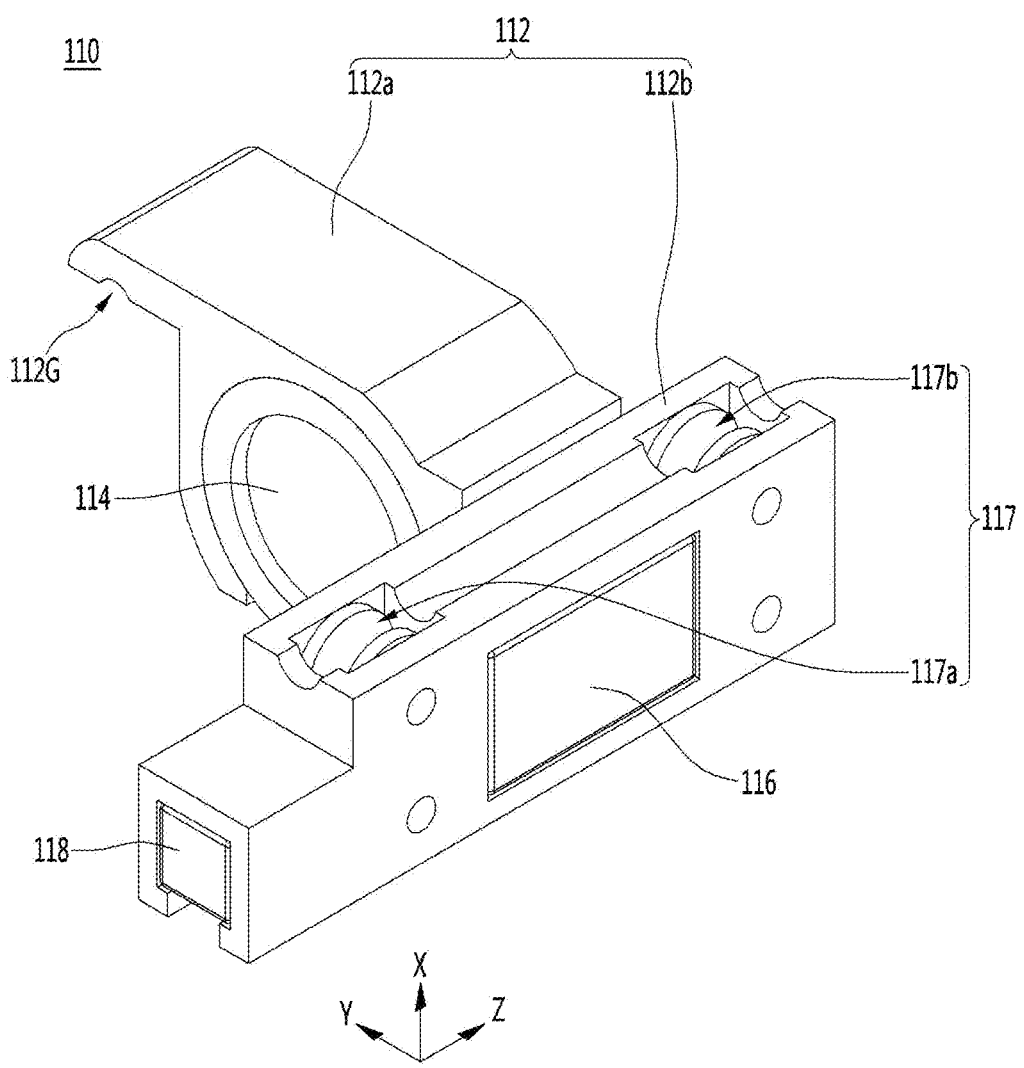
FIG. 4A is a perspective view of a first lens assembly in the camera module according to the embodiment shown in FIG. 2.
Figure 4B:
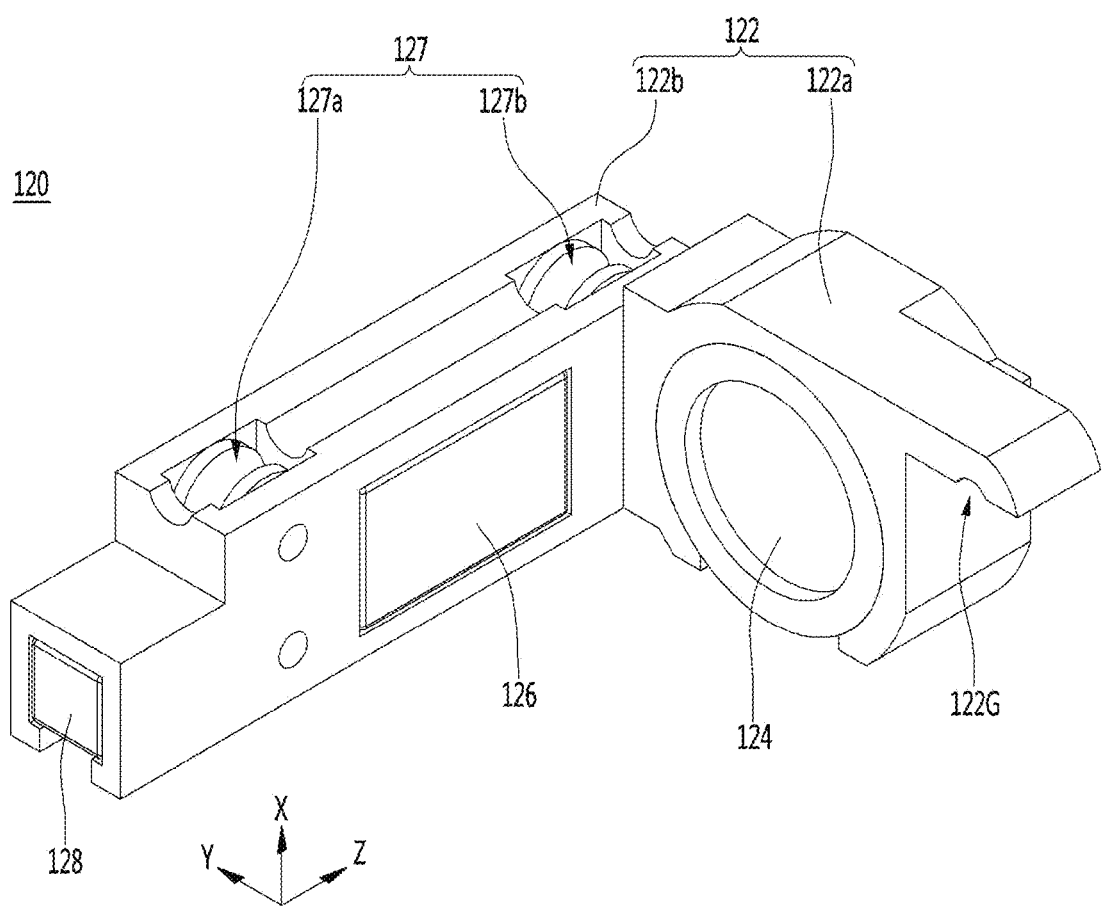
FIG. 4B is a perspective view of a second lens assembly in the camera module according to the embodiment shown in FIG. 2.

Referring to FIGS. 4A and 4B, the first lens assembly 110 and the second lens assembly 120 will be described in more detail in the embodiment. Each embodiment of FIGS. 4A and 4B may be referred to as a first mover or a second mover. The mover may be an integral component that is actually moved by an external force such as electromagnetic force. For example, the mover may include a housing, a lens disposed on the housing, a wheel, a driving magnet, a sensing magnet, and the like, and at least one or more of the above components may be omitted.

FIG. 4A is a perspective view of the first lens assembly 110 in the camera module according to the embodiment shown in FIG. 2, and FIG. 4B is a perspective view of the second lens assembly 120 in the camera module according to the embodiment shown in FIG. 2.

Referring to FIG. 4A, the first lens assembly 110 of the embodiment may include any one or more of a first housing 112, a first lens group 114, a first wheel 117, a third driving unit 116, and a first position sensor 118.

Also, referring to FIG. 4B, the second lens assembly 120 of the embodiment may include any one or more of a second housing 122, a second lens group 124, a second wheel 127, a fourth driving unit 126, and a second position sensor 128.

Hereinafter, a description will be given focusing on the first lens assembly 110.

The first housing 112 of the first lens assembly 110 may include a first lens housing 112a and a first driving unit housing 112b. The first lens housing 112a functions as a barrel, and a first lens group 114 may be mounted. The first lens group 114 may be a moving lens group, and may include a single lens or a plurality of lenses. The second housing 122 of the second lens assembly 120 may also include a second lens housing 122a and a second driving unit housing 122b.

In this case, a first guide groove 112G may be formed under one end of the first lens housing 112a of the first lens assembly 110. The first lens assembly 110 may be guided by the first guide groove 112G to move in a straight line in the optical axis direction while sliding contact with the second pin 52. In addition, a second guide groove 122G may be formed below one end of the second lens housing 122a of the second lens assembly 120.

In the embodiment, since the first housing 112 is provided to move in the optical axis direction by sliding contact between the second pin 52 and the first guide groove 112G, a camera module can perform an efficient autofocusing and zooming function.

In addition, in the embodiment, since the second housing 122 is provided to move in the optical axis direction by sliding contact between the first pin 51 and the second guide groove 122G, it is possible to implement a camera module that performs an efficient autofocusing and zooming function.

Next, a third driving unit 116, a first wheel 117, and a first position sensor 118 may be disposed in the first driving unit housing 112b of the first lens assembly 110. The first wheel 117 may include a plurality of wheels, and may include a first-first wheel 117a and a first-second wheel 117b.

In addition, a fourth driving unit 126, a second wheel 127, and a second position sensor 128 may be disposed in the second driving unit housing 122b of the second lens assembly 120. The second wheel 127 may include a plurality of wheels, and may include a second-first wheel 127a and a second-second wheel 127b.

In an embodiment, a groove may be formed in the drive housing so that a pin can be disposed. In addition, a shape of a groove disposed in the driving unit housing may have a shape corresponding to a shape of the pin or a shape of a surface contacting the pin of a wheel disposed in the driving unit housing.

In addition, a groove formed in the driving unit housing may be formed at a position corresponding to a wheel disposed in the driving unit housing.

In addition, in an embodiment, the thickness of the driving part housing in which the position sensor is disposed may be thinner than the thickness of the driving part housing in which the wheel is disposed.

In addition, in the embodiment, the driving unit housing in which the wheel is disposed may protrude to one side of the area of the driving unit housing in which the position sensor is disposed so that the wheel can make good contact with the pins.

The third driving unit 116 of the first lens assembly 110 may be a magnet driving unit, but is not limited thereto. For example, the third driving unit 116 may include a first magnet that is a permanent magnet. Also, the fourth driving unit 126 of the second lens assembly 120 may be a magnet driving unit, but is not limited thereto.

Figure 5A:
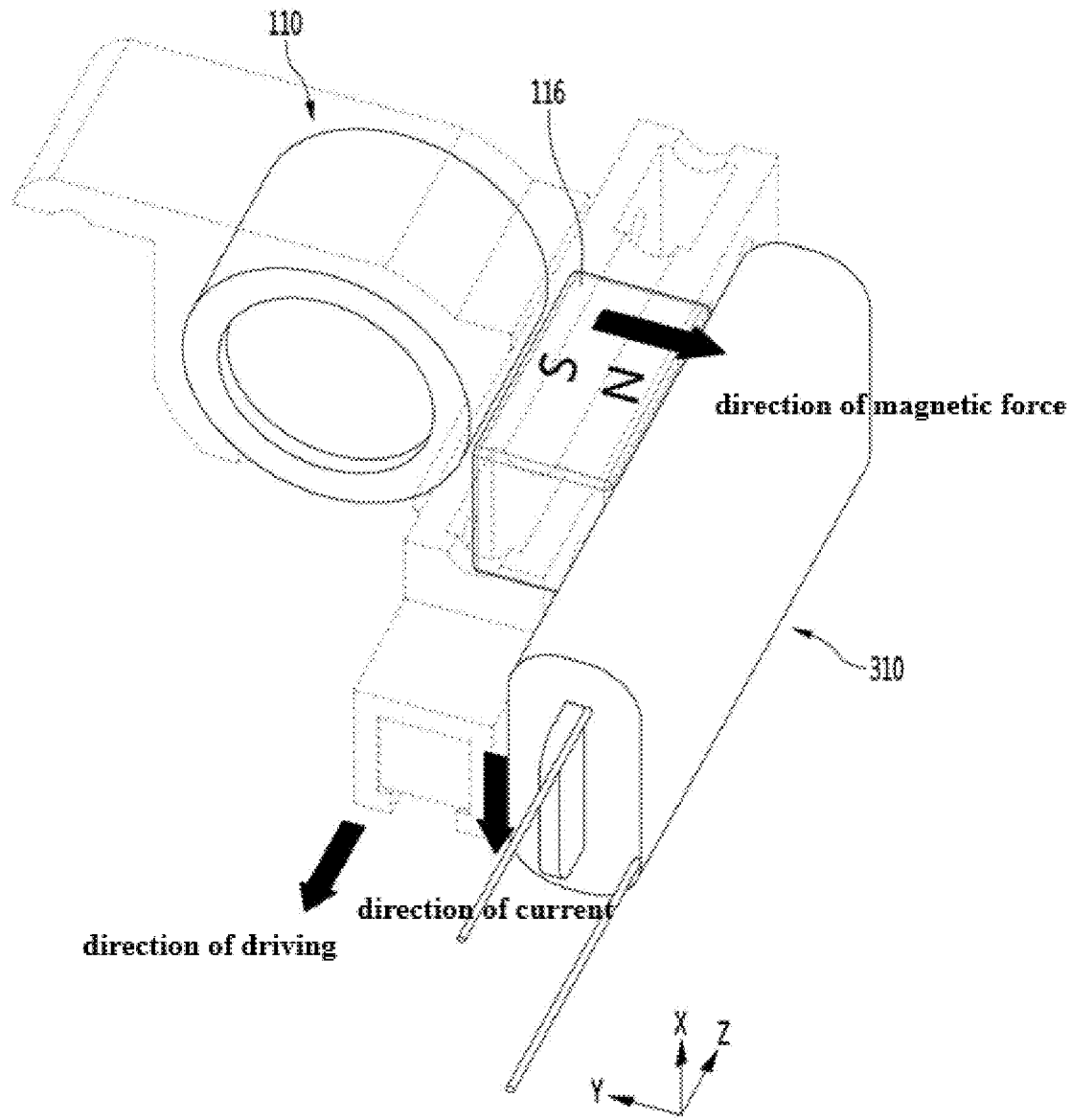
FIG. 5A is a conceptual diagram illustrating a first magnetization method of a magnet in the camera module according to the embodiment shown in FIG. 3B.

For example, FIG. 5A is a conceptual diagram of the first magnetization method of the first magnet in the third driving unit 116 of the first lens assembly 110, and the N pole of the permanent magnet is arranged to face the first driving unit 310 and, the S pole may be located on the opposite side of the first driving unit 310.

In this case, according to Fleming's left-hand rule, the direction of the electromagnetic force becomes horizontal with the direction of the optical axis, so that the first lens assembly 110 may be driven.

In particular, in the embodiment, as shown in FIG. 4A, the first lens assembly 110 is provided with a first wheel 117 as a rolling drive unit and moves on the pin 50 to minimize the occurrence of friction torque.

Through this, the lens assembly, the lens driving device, and the camera module including the same according to the embodiment may improve driving force by minimizing the occurrence of friction torque between the lens assembly and the guide pin that are moved during zooming. Accordingly, according to the embodiment, there is a technical effect of reducing power consumption when zooming the camera module and improving control characteristics.

Figure 5B:
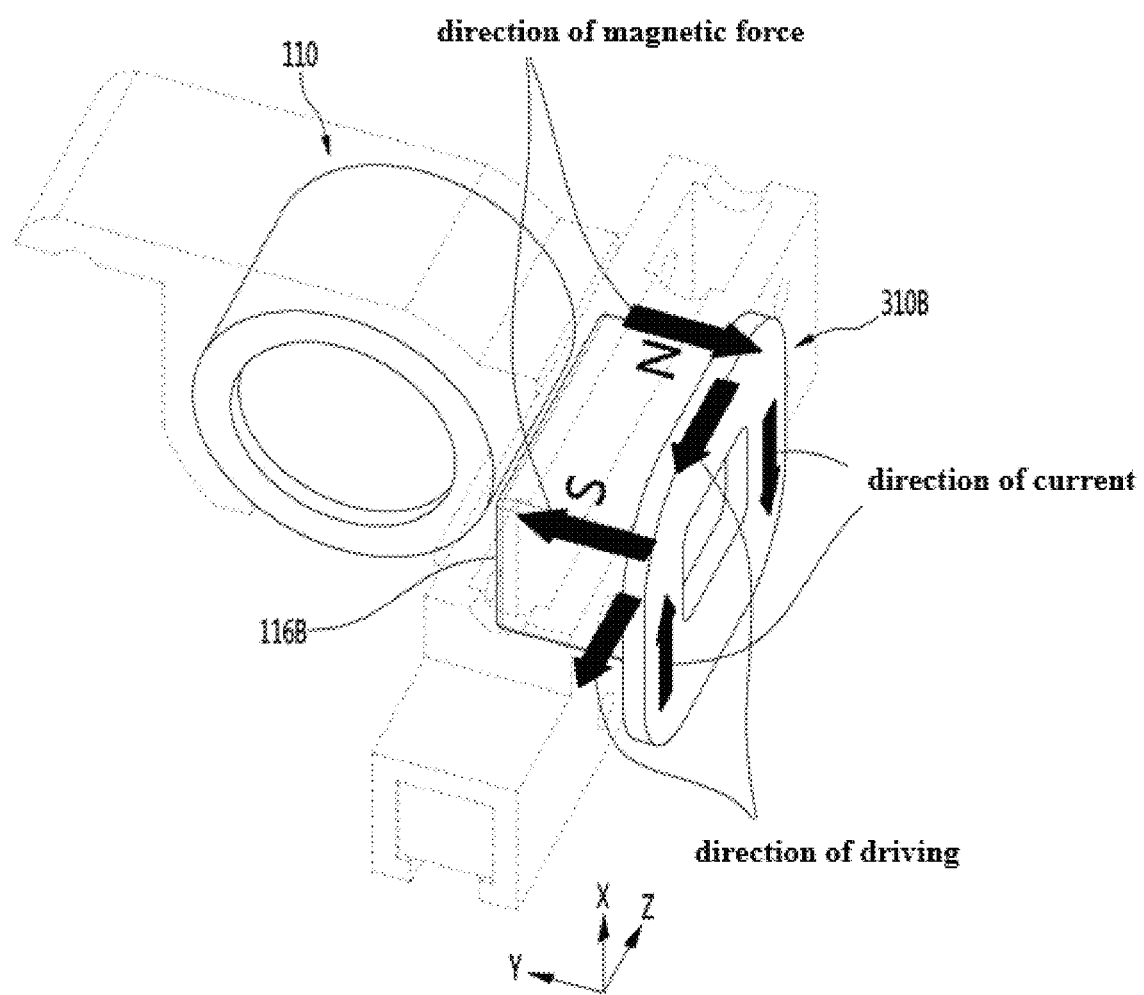
FIG. 5B is a conceptual diagram of a second magnetization method of a magnet in the camera module according to the embodiment shown in FIG. 3A.

Meanwhile, FIG. 5B is a conceptual diagram illustrating a second magnetization method of a magnet, which is a first driving unit 116B, in a camera module according to an exemplary embodiment.

In FIG. 5A, the first driving unit 310 has a first coil 314 wound around a bar-shaped first core 312 (see FIG. 3B). On the other hand, the first-second drive part 310B shown in FIG. 5B has a coil wound around a donut-shaped core.

Accordingly, the direction of the current in a region facing the third driving unit 116 in the first driving unit 310 of FIG. 5A is one direction.

On the other hand, the direction of the current in the area facing the third driver 116 in the first-second driver 310B of FIG. 5B is not the same, and accordingly, the N pole of the permanent magnet, which is the third-second driver 116B. Both the N and S poles may be disposed to face the first-second driving unit 310B.

Referring back to FIG. 4A, a first position sensor 118 is disposed in the first driving part housing 112b of the first lens assembly to detect and control the position of the first lens assembly 110. For example, the first position sensor 118 disposed on the first driving unit housing 112b may be disposed to face a first sensing magnet (not shown) disposed on the bottom surface of the case 20.

In addition, as shown in FIG. 4B, a second position sensor 128 is also disposed in the second driving part housing 122b of the second lens assembly to detect and control the position of the second lens assembly 120. For example, as shown in FIG. 13B, the second position sensor 128 disposed on the second driving unit housing 122b may be disposed to face the second sensing magnet 410 disposed on the bottom surface of the case 20.

Figure 6:
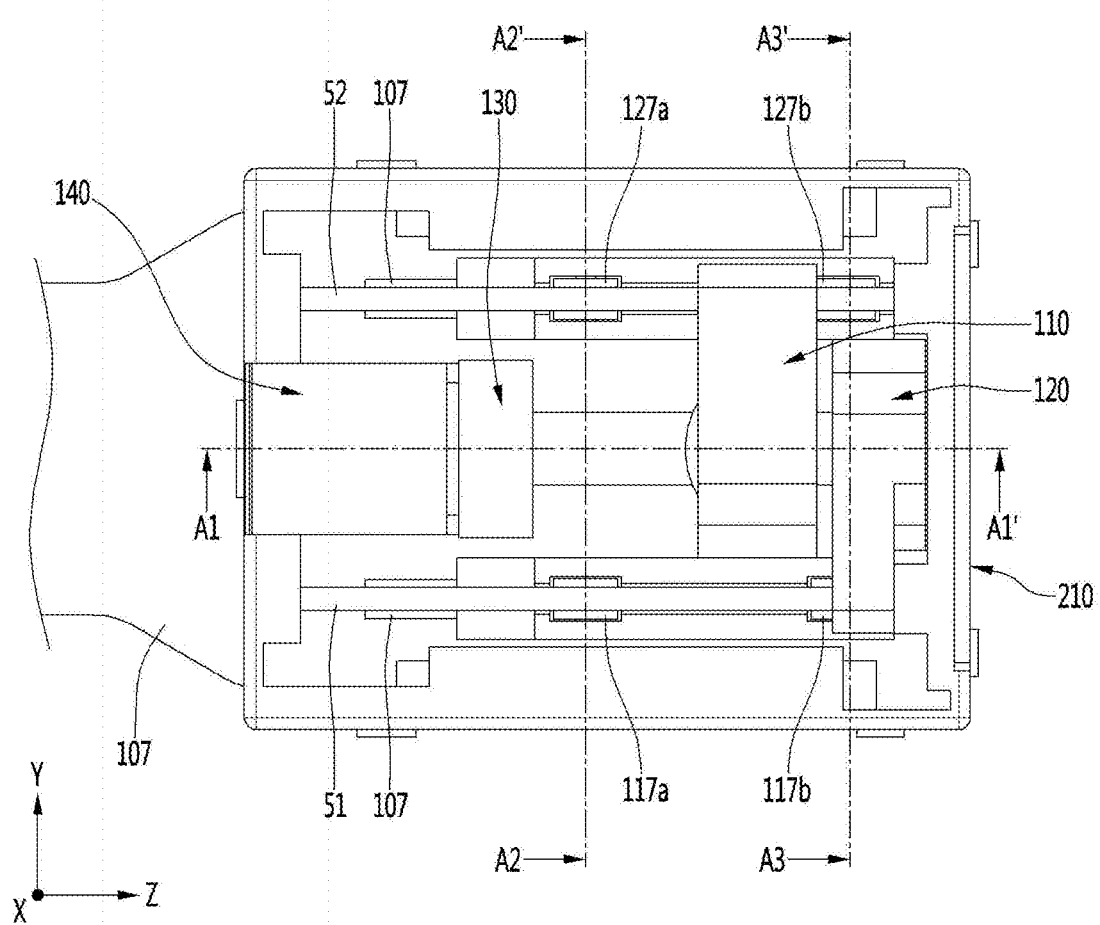
FIG. 6 is a plan view of the camera module according to the embodiment shown in FIG. 2.

Next, FIG. 6 is a plan view of the camera module according to the embodiment shown in FIG. 2.

Figure 7A:
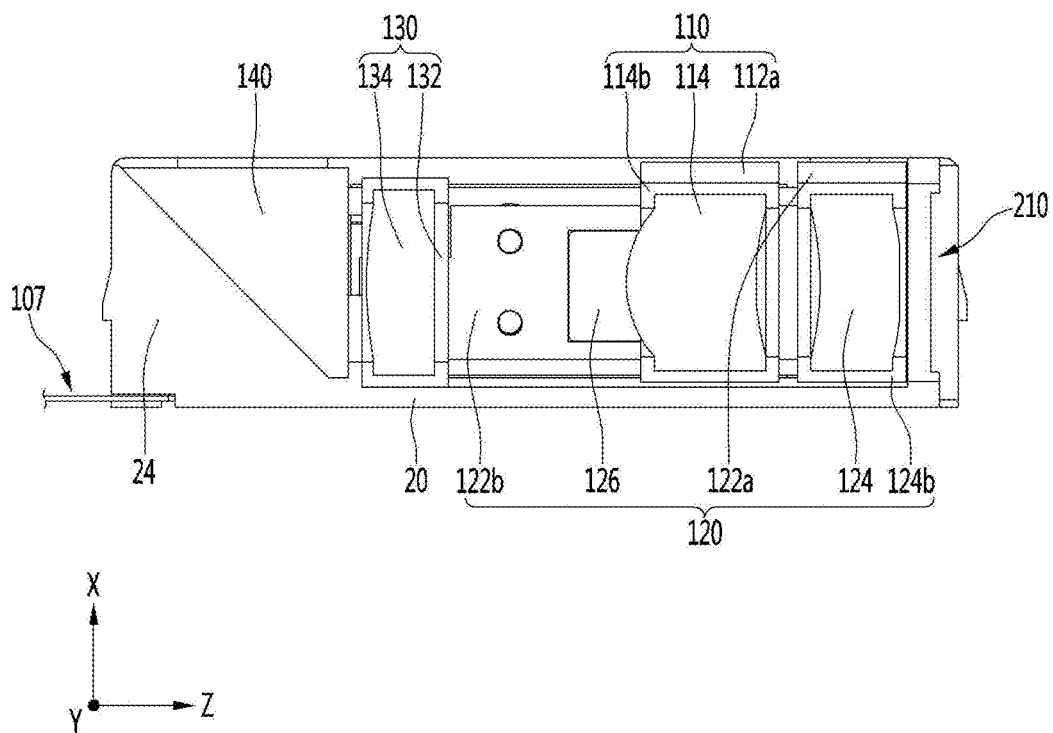
FIG. 7A is a view of a sectional view taken along line A1-A1' of the camera module according to the embodiment shown in FIG. 6.

In addition, FIG. 7A is a view of the camera module according to the embodiment shown in FIG. 6 as viewed directly along the line A1-A1' in the Y-axis direction.

Figure 7B:
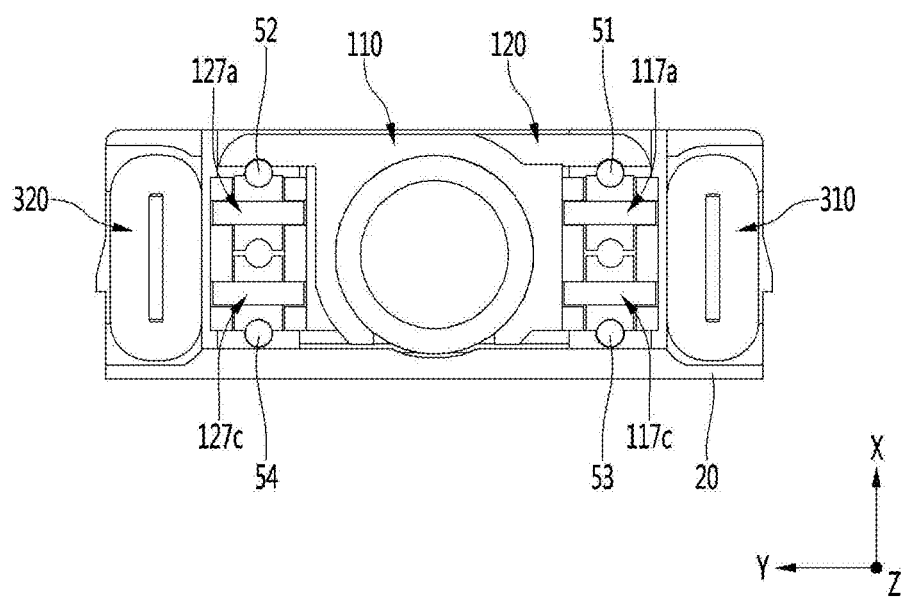
FIG. 7B is a view of a cross-sectional view taken along line A2-A2' of the camera module according to the embodiment shown in FIG. 6.

In addition, FIG. 7B is a view of the camera module according to the embodiment shown in FIG. 6 as viewed directly along the line A2-A2' in the Z-axis direction.

In addition, 7C is a view of the camera module according to the embodiment shown in FIG. 6 as viewed directly in the Z-axis direction of a cut surface along line A3-A3'.

First, in FIG. 7A, the second driving unit housing 122 and the fourth driving unit 126 of the second lens assembly 120 are shown as not cut.

Referring to FIG. 7A, the first lens group 114 may be mounted on the first lens housing 112a of the first lens assembly 110. The first lens group 114 may be mounted on the first barrel 114b.

In addition, the second lens group 124 may be mounted on the second lens housing 122a of the second lens assembly 120. The second lens group 124 may be mounted on the second barrel 124b.

In addition, the third lens group 130 may include a third lens 134 mounted on the third barrel 1132.

Each of the first to third lens groups 114, 124, and 134 may include one or a plurality of lenses.

In the camera module according to the embodiment, the centers of the prism 140, the third lens group 130, the first lens group 114, and the second lens group 124 may be arranged in the direction of the optical axis (Z).

The third lens group 130 may be disposed to face the prism 140, and light emitted from the prism 140 may enter.

At least one of the first to third lens groups 114, 124, and 134 may be a fixed lens. For example, the third lens group 130 may be fixedly disposed on the camera module and may not move in the optical axis direction, but is not limited thereto.

For example, the case 20 may include a mounting portion (not shown) to which the third lens group 130 is fixedly coupled. The third lens group 130 may be disposed on the mounting portion and fixed to the mounting portion by an adhesive.

The second lens group 124 is disposed to be spaced apart from the third lens group 130 in the optical axis direction, and may move in the optical axis direction. The third lens group 130 is disposed to be spaced apart from the second lens group 124 in the optical axis direction and may be moved in the optical axis direction.

The light emitted from the third lens group 130 may enter the image sensor unit 210 disposed behind the third lens group 130.

As the first lens group 114 and the second lens group 124 move in the optical axis direction, the distance between the first lens group 114 and the third lens group 130 and the distance between the first lens group 114 and the second lens group 124 can be adjusted, and thus the camera module can perform a zooming function.

Next, FIG. 7B is a view as viewed directly in the Z-axis direction of the cut surface along line A2-A2' of the camera module according to the embodiment shown in FIG. 6, and the first-first wheel 117a in the first lens assembly 110, the first-third wheel 117c are shown in a cut state, and the second-first wheel 127a, the second-third wheel 127c are shown in cut out in the second lens assembly 120.

In an embodiment, the first lens assembly 110 includes a first-first wheel 117a and a first-third wheel 117c as a rolling driving unit, and the second lens assembly 120 is also a rolling driving unit and may include a second-first wheel 127a and a second-third wheel 127c. Through this, the embodiment has a technical effect that can minimize the occurrence of friction torque by rolling by electromagnetic force on the first pin 51, the third pin 53, the second pin 52, and the fourth pin 54, respectively.

Through this, the lens assembly, the lens driving device, and the camera module including the same according to the embodiment can minimize the occurrence of friction torque between the guide pin 50 and the wheel, which is the rolling drive unit of the lens assembly that moves in the optical axis (Z) direction during zooming and driving power can be improved.

In addition, according to the embodiment, by minimizing the occurrence of frictional resistance between the wheel and the pin 50 of the lens assembly, power consumption during zooming of the camera module can be reduced, and there is a technical effect of improving control characteristics.

Figure 7C:
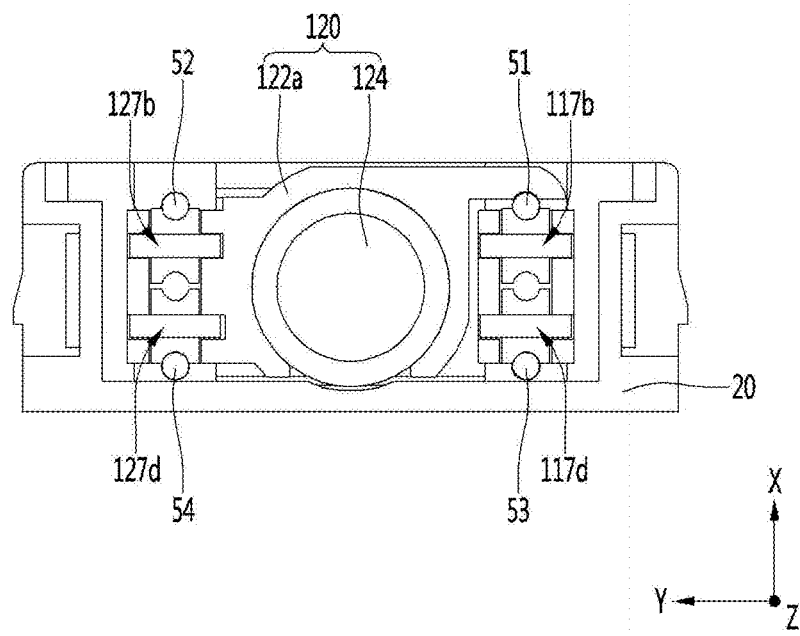
FIG. 7C is a view of a sectional view taken along line A3-A3' of the camera module according to the embodiment shown in FIG. 6.

Next, FIG. 7C is a view of the camera module according to the embodiment shown in FIG. 6 as viewed directly along the line A3-A3' in the Z-axis direction. In the first lens assembly 110, the first-second wheel 117b and the first-fourth wheel 117d are shown as cut off. And the second-second wheel 127b, the second-forth wheel 127d of the second lens assembly 120, the second lens housing 122a, and the second lens group 124 are shown in a cut state.

In the embodiment, the first lens assembly 110 includes a first-second wheel 117b and a first-fourth wheel 117d provided on each of the first pin 51, the third pin 53, which are rolling driving units. And the second lens assembly 120 is also a rolling driving unit and includes a second-second wheel 127b and a second-fourth wheels 127d provided on each of the second pin 52 and the fourth pin 54. Thereby, there is a technical effect that can minimize the occurrence of friction torque by rolling moving.

Through this, according to the embodiment, there are complex technical effects to improve driving force by minimizing the occurrence of friction torque between the wheel and the pin 50 of the lens assembly during zooming, reduce power consumption, and improve control characteristics.

Figure 8A:
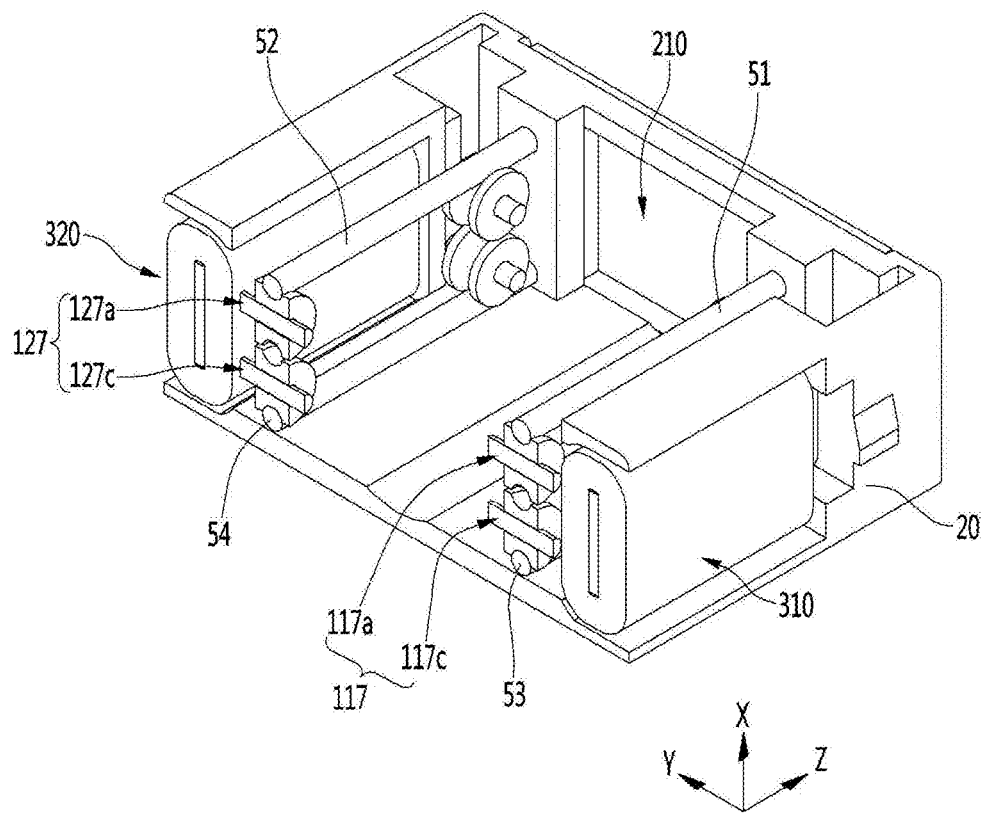
FIG. 8A is a cross-sectional perspective view taken along line A2-A2' after the first housing and the second housing are removed from the camera module according to the embodiment shown in FIG. 6.
Figure 8B:
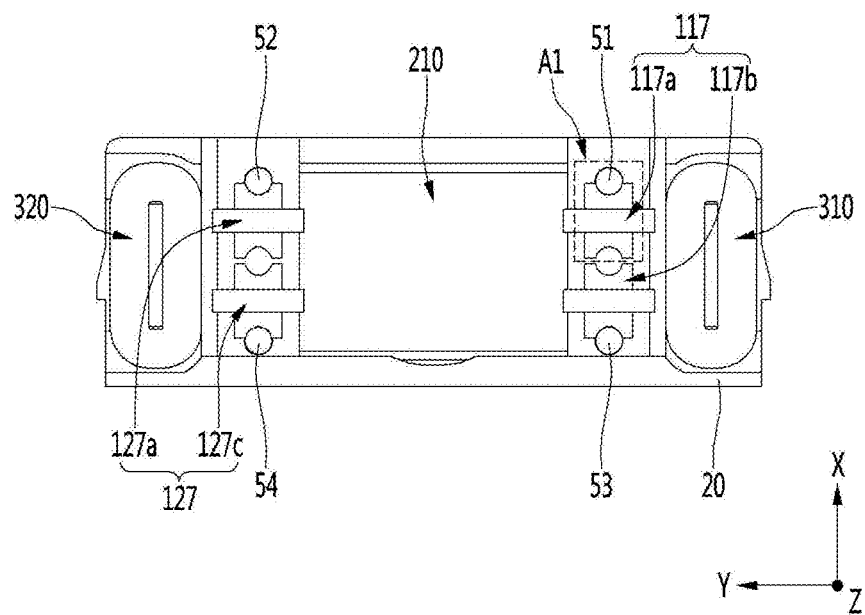
FIG. 8B is a cross-sectional view as viewed in the z-axis direction from the camera module according to the embodiment illustrated in FIG. 8A.

Next, FIG. 8A is a cross-sectional perspective view taken along line A2-A2' after the first housing 112 and the second housing 122 are removed from the camera module according to the embodiment shown in FIG. 6, and FIG. 8B is As a cross-sectional view of the camera module according to the embodiment shown in FIG. 8A viewed from the z-axis direction, the image sensor unit 210 is not in a cut state.

Meanwhile, in FIGS. 8A and 8B, only the first wheel 117 and the second wheel 127 are shown as components of the first lens assembly 110 and the second lens assembly 120, respectively. The first wheel 117 may include a first-first wheel 117a and a first-third wheel 117c. The second wheel 127 may include a second-first wheel 127a and a second-third wheel 127c.

Figure 10:
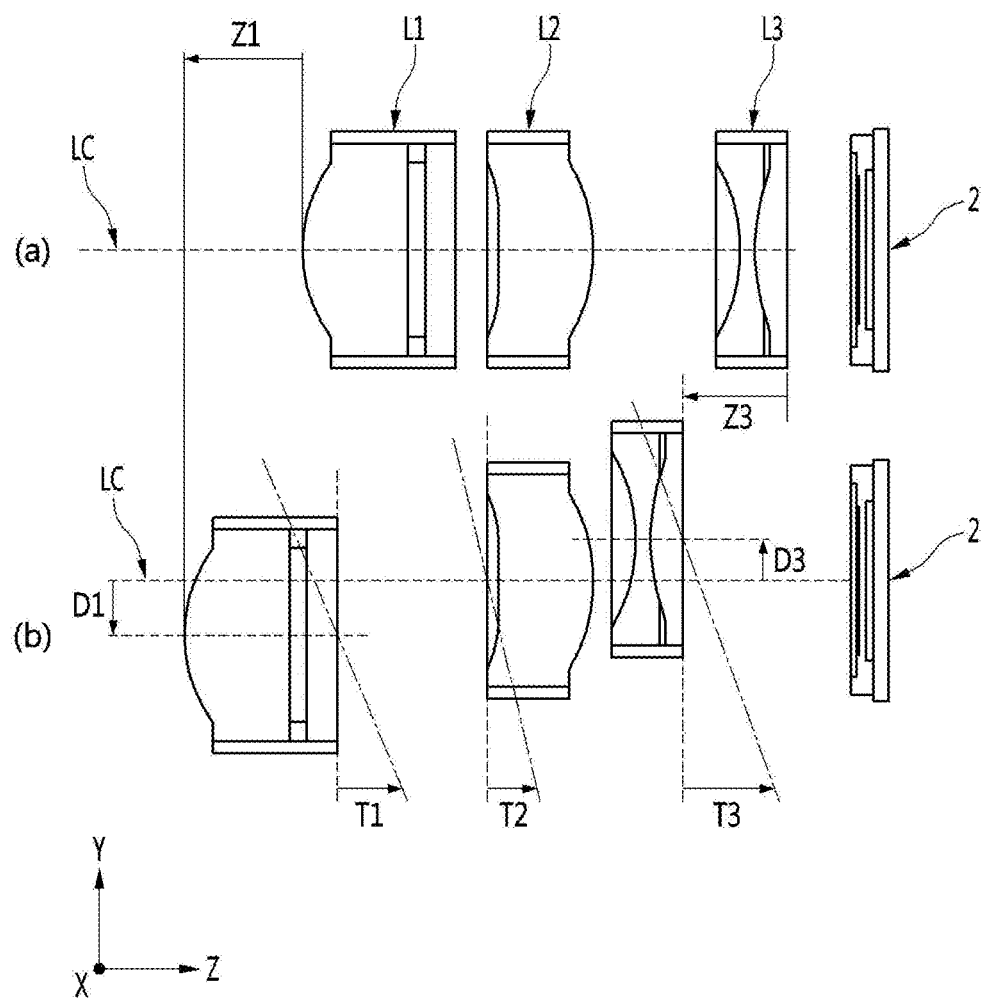
FIG. 10 is a conceptual diagram of a decenter or tilt generated when a lens is moved in a camera module.
Figure 11A:
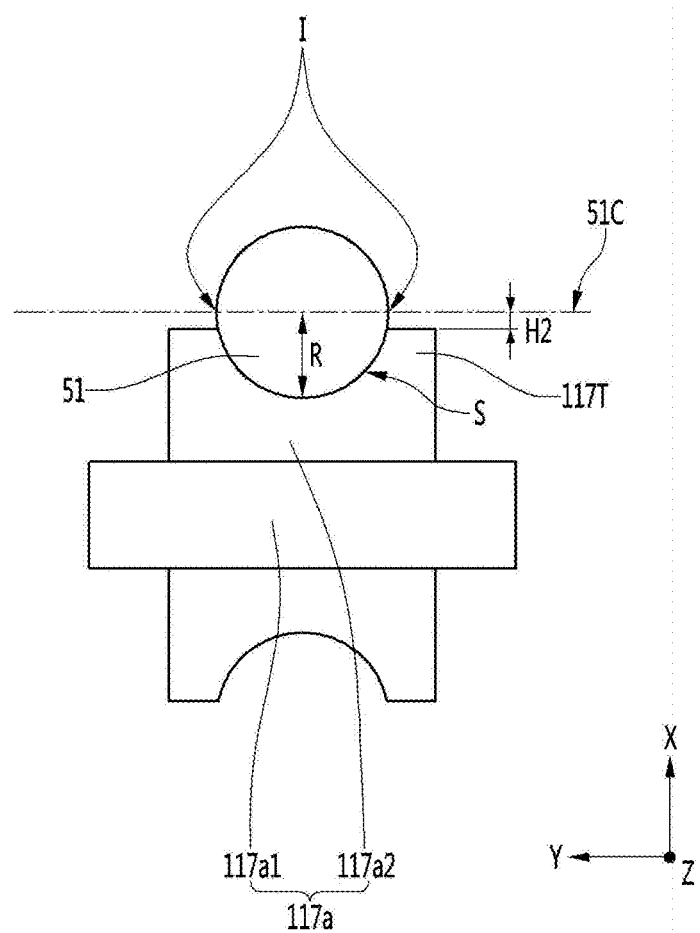
FIGS. 11A and 11B are first cross-sectional views of wheels and pins in a first area in the lens driving unit shown in FIG. 8B.

The enlarged view of the first area A1 in FIG. 8B is FIG. 11A. Prior to describing this, the contents of FIGS. 9 and 10 will be described.

Figure 9:
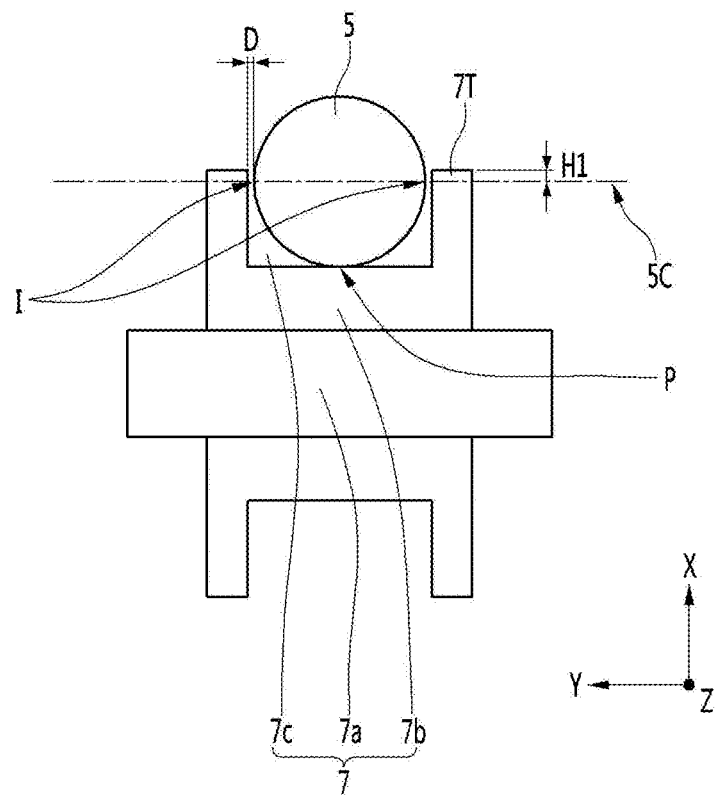
FIG. 9 is a cross-sectional view of a wheel and a pin in a lens driving part of a camera module of an internal technology.

FIG. 9 is a cross-sectional view of the wheel 7 and the guide pin 5 in the lens driving part of the camera module, which is a private internal technology.

The wheel 7 may include a rotating shaft 7a and a rotation part 7b, and the rotation part 7b may include a trench-shaped rotating groove 7c accommodating the guide pin 5.

According to the internal technology, the lens assembly can be moved by rolling movement of the wheel 7 along the guide pin 5.

However, according to the internal technology, since the pin 5 and the wheel 7 are in contact with each other in a partial region P, the friction torque may increase, and there is also a problem of wear due to friction resistance.

In particular, in the internal technology, the upper end 7T of the wheel is disposed higher than the horizontal central axis 5C (based on the Y-axis direction) by the first height H1 so that the lens assembly is not separated. The point where the horizontal central axis 5C of the pin and the outer diameter of the pin 5 meet may be referred to as a curved point I.

In addition, in order to reduce frictional resistance when the lens assembly is moved, a gap D can be formed between the pin 5 and the rotation groove 7c. Due to the gap D, lens decenter or lens tilt may occur.

Specifically, FIG. 10 is a conceptual diagram of a decenter or tilt generated when a lens is moved in a camera module.

The camera module may implement a zoom function using a plurality of lens groups L1, L2, and L3.

For example, as shown in (a) of FIG. 10, the camera module may include a first lens group L1, a second lens group L2, a third lens group L3, and an image sensor 2. When the center of each lens group is aligned with the optical axis LC, the first lens group L1 and the third lens group L3 may move for the first distance Z1 and the third distance Z3 respectively.

However, in order to obtain the best optical properties, the alignment between lenses must be well matched. However, when there is a gap D between the wheel and the pin as shown in FIG. 10, as shown in FIG. 10B, the spherical center of the first lens group L1 and the spherical center of the third lens group L3 are deviated from the optical axis LC, so that the decent can occur for a first width D1 and a third width D3, respectively. In addition, the axis of symmetry of the first lens group L1, the axis of symmetry of the second lens group L2 and the axis of symmetry of the third lens group L3 are inclined, and results in lens tilt phenomenon (T1, T2, T3) such that there is a problem that the angle of view changes or out of focus occurs.

Figure 11B:
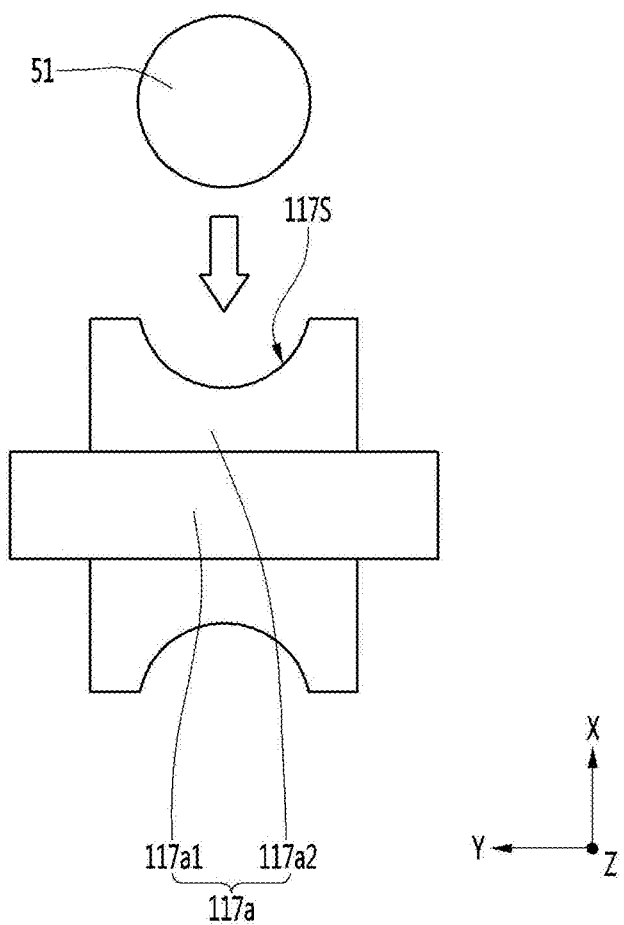

FIGS. 11A and 11B are first cross-sectional views illustrating the wheels and pins of the first area A1 in the lens driving unit illustrated in FIG. 8B.

One of the technical objects of the embodiment is to provide a lens assembly, a lens driving device, and a camera module including the same that can inhibit the occurrence of lens decenter or lens tilt when the lens is moved through zooming in the camera module.

Referring to FIGS. 4A and 11A, the first lens assembly 110 according to the embodiment includes a first lens group 114 and a first housing 112 moving and coupled to the first lens group 114.

The first housing 112 may include a first wheel 117 for moving the first lens group 114.

For example, referring to FIG. 11A, the first wheel 117 includes a first-first wheel 117a, and the first-first wheel 117a includes a first rotation shaft 117a1 and a first rotating portion 117a2 that rotates about the first rotation shaft 117a1. Referring to FIG. 11B, in an embodiment, the first rotation part 117a2 may include a curved groove 117S.

In addition, as shown in FIG. 11A, the first-first wheel 117a may be disposed under the first pin 51, and an upper end 117T of the first rotation part 117a2 may be located lower than the horizontal central axis 51C of the first pin 51. For example, the upper end 117T of the first rotation part may be positioned lower than the curved point I of the first pin 51.

For example, a gap distance between the upper end 117T of the first rotating part 117a2 and the horizontal central axis 51C of the first pin 51 may be a second height H2. The second height H2 may be in the range of ½ to ⅔ of the radius R (R/2 to 2R/3) of the first fin 51. The upper end of the first rotation part may be positioned lower than the horizontal central axis 51C of the first pin 51 by a second height H2.

When the second height H2, which is the gap, is less than the lower limit, friction between the first pin 51 and the side surface of the first rotating part 117a2 may increase. On the other hand, when the gap exceeds the upper limit, it is difficult for the first pin 51 to be seated on the first-first wheel 117a due to an increase of the gap distance between the first pin 51 and the first-first wheel 117a.

According to the embodiment, when zooming, by distributing contact resistance by making surface contact S between the first rotation part 117a2 and the first pin 51, the generation of vibration due to friction torque can be inhibited, and there is a technical effect that can significantly improve image quality or resolution by inhibiting the occurrence of decent or lens tilt.

In addition, according to the embodiment, the first pin 51 can be stably disposed in the curved groove 117S of the first rotation part 117a2, and the gap between the first rotation part 117a2 and the first pin 51 is almost eliminated. By disposing the upper end 117T of the first rotation part lower than the horizontal central axis of the first pin 51 to eliminate friction between the sidewall of the first rotation part 117a2 and the first pin 51, vibration generation during zooming can be minimized. Thus, there is a technical effect of inhibiting the occurrence of a lens decent or a lens tilt.

Figure 11C:
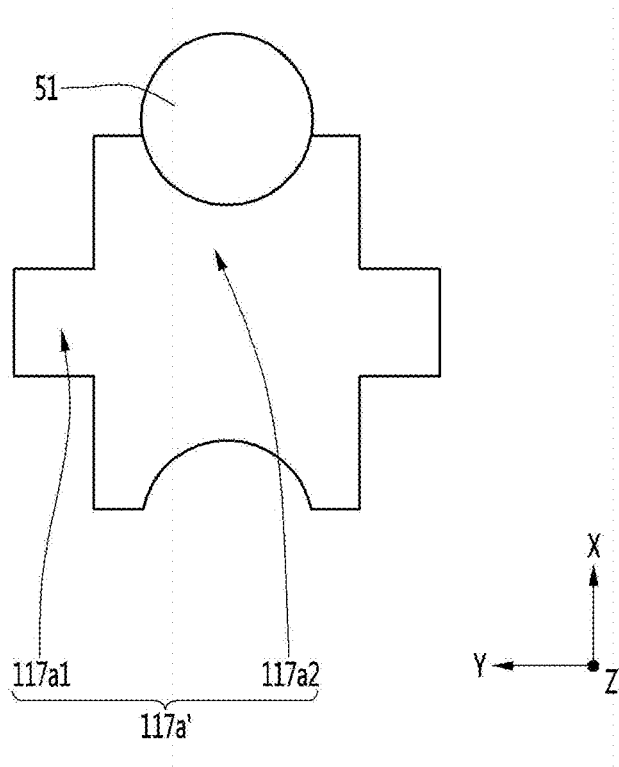
FIG. 11C is another exemplary view of a first area in the lens driver shown in FIG. 8B.

Next, FIG. 11C is a second cross-sectional view illustrating a wheel and a pin of the lens driving unit illustrated in FIG. 11A. For example, according to FIG. 11C, in the first wheel 117a', the first rotation shaft 117a1 and the first rotation part 117a2 may be integrally formed.

For example, when the first driving unit housing 112b is formed of metal, the first rotating shaft 117a1 and the first rotating unit 117a2 may be integrally formed, and the rotation shaft 117a1 may be rotated in the first driving unit housing 112b.

Figure 11D:
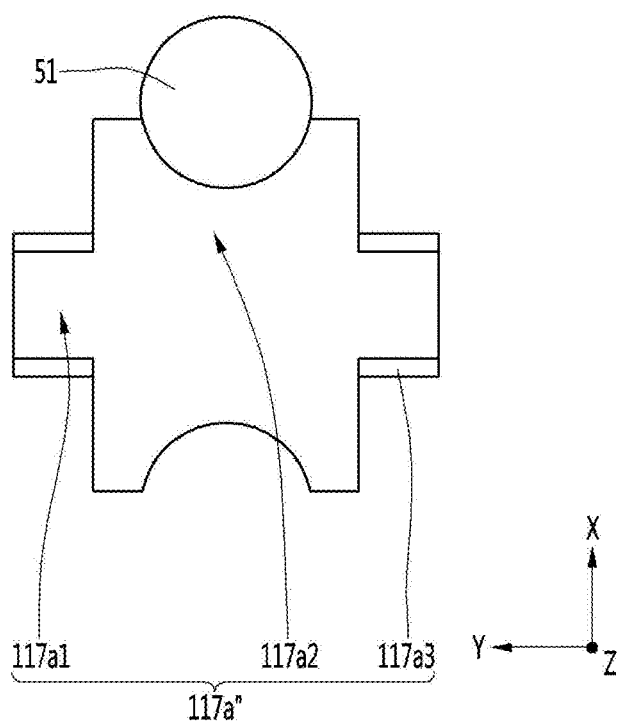
FIG. 11D is another exemplary view of a first area in the lens driver shown in FIG. 8B.

In addition, FIG. 11D is a third cross-sectional view illustrating a wheel and a pin of the lens driving unit illustrated in FIG. 11A.

FIG. 11D, in the first wheel 117a, the first rotation shaft 117a1 and the first rotation part 117a2 may be integrally formed, and the first bushing 117a3 is disposed on the first rotation shaft 117a1. The first rotation shaft 117a1 may be rotated while contacting the first bushing 117a3.

Figure 12A:
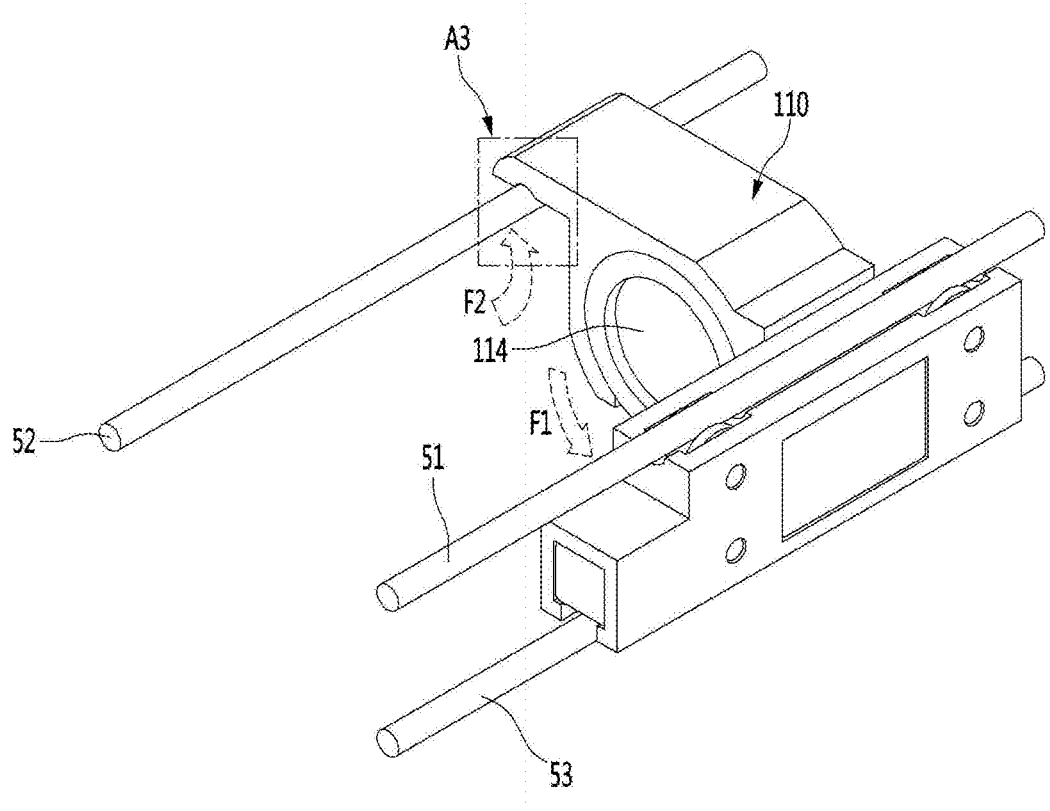
FIG. 12A is a perspective view of a first lens assembly and a pin in the camera module according to the embodiment shown in FIG. 2.

Next, FIG. 12A is a perspective view of the first lens assembly 110 and the pin 50 in the camera module according to the embodiment shown in FIG. 2. The first lens assembly 110 may be guided and moved through the first pin 51, the second pin 52, and the third pin 53.

At this time, since the first lens group 114 of the first lens assembly 110 can be tilted downward by gravity F1, a stable structure of the lens assembly due to the support force F2 by the second pin 52 can be maintained.

Figure 12B:
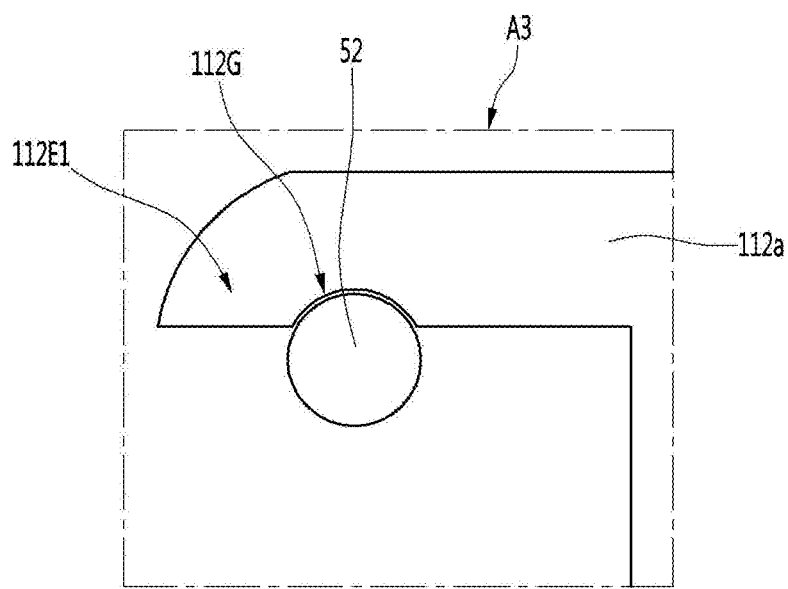
FIG. 12B is a first enlarged view of the guide portion A3 shown in FIG. 12A.

FIG. 12B is a first enlarged view of the guide portion A3 shown in FIG. 12A.

The first end 112E1 of the first lens housing 112a according to the embodiment has a first guide groove 112G so that the first lens housing 112a can be stably guided on the second pin 52.

Figure 12C:
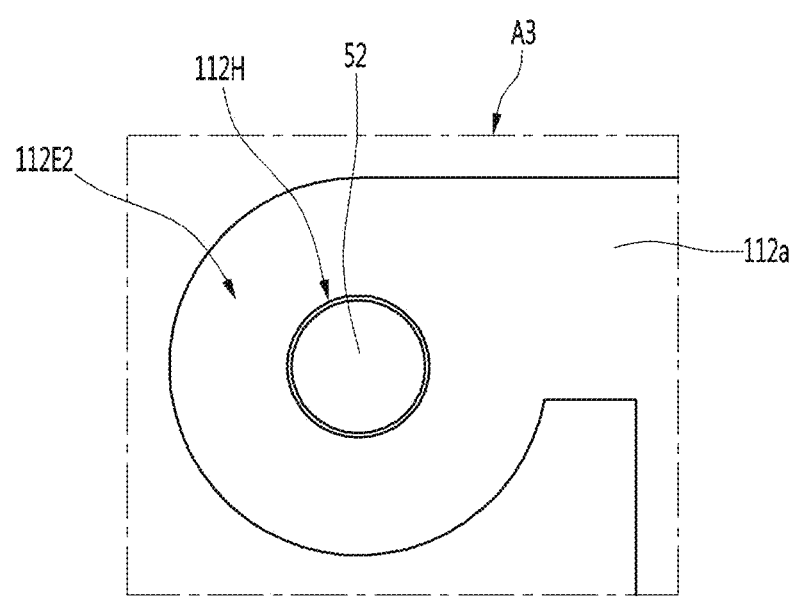
FIG. 12C is another exemplary view of the guide portion A3 shown in FIG. 12A.

FIG. 12C is another exemplary view of the guide portion A3 shown in FIG. 12A.

The second end 112E2 of the first lens housing 112a according to the embodiment has a first guide hole 112H, and a second pin 52 is disposed in the first guide hole 112H, so that the first lens housing 112a can be driven while being guided more stably to the second pin 52.

Figure 13A:
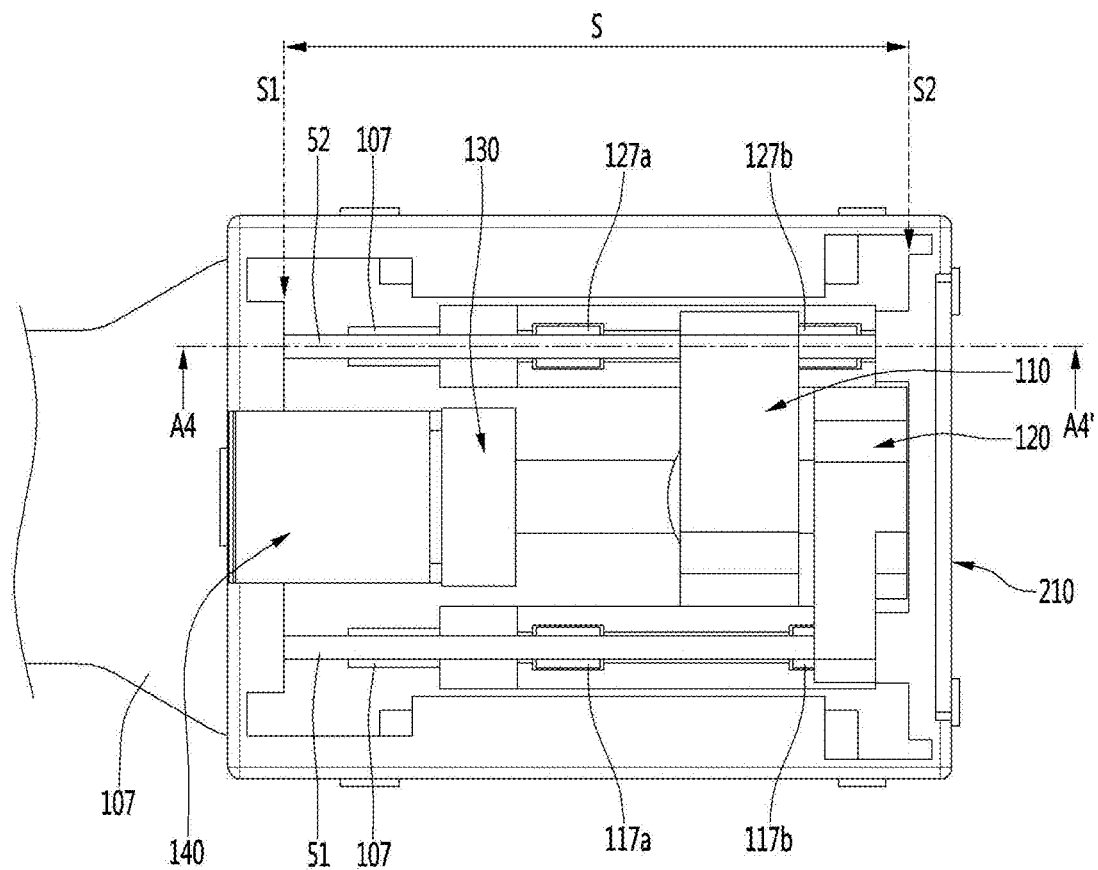
FIG. 13A is a plan view of the camera module according to the embodiment shown in FIG. 2.
Figure 13B:
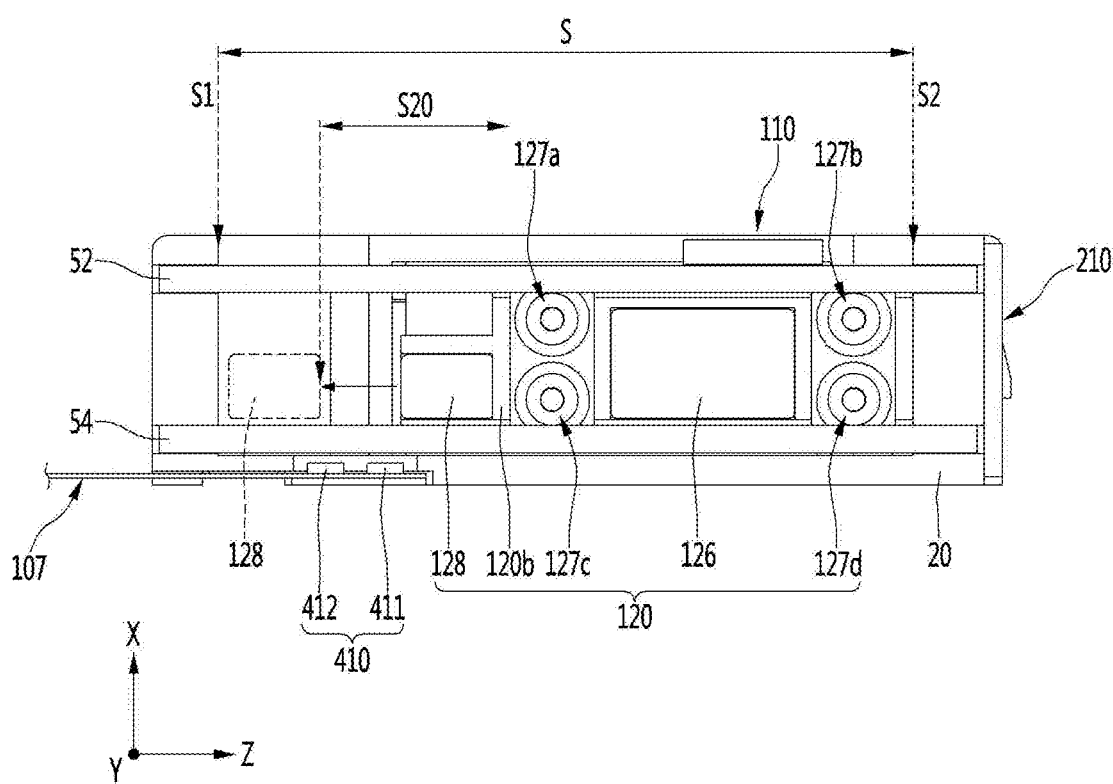
FIG. 13B is a cross-sectional view taken along line A4-A4' of the camera module according to the embodiment shown in FIG. 13A.
Figure 13C:
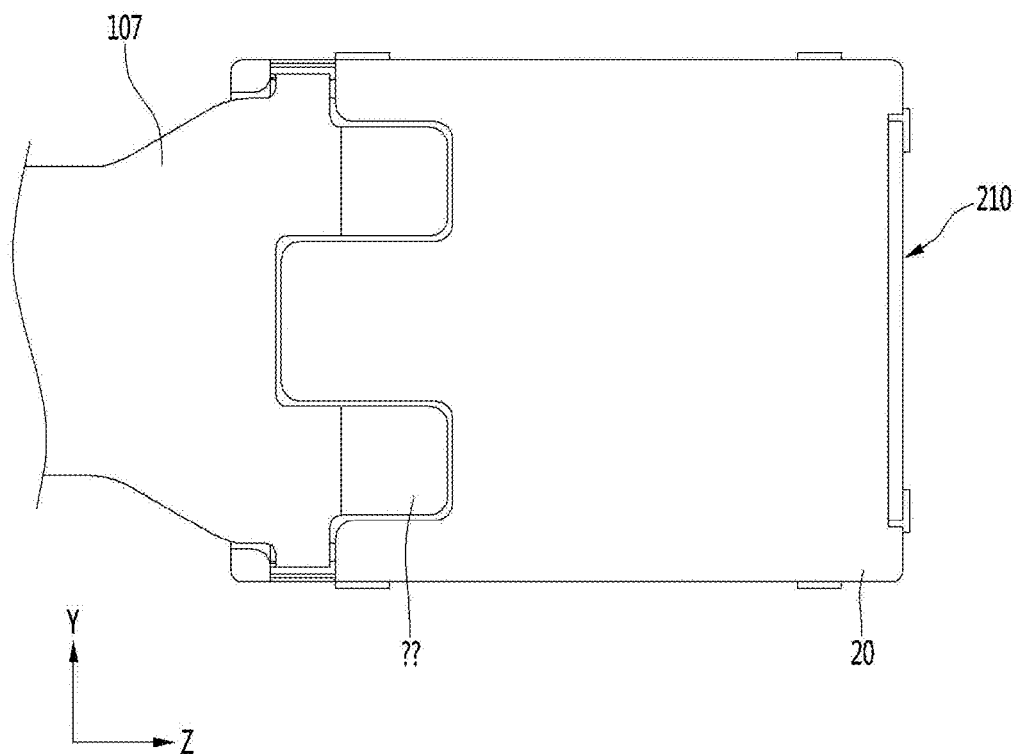
FIG. 13C is a bottom view of the camera module according to the embodiment shown in FIG. 13A.

FIG. 13A is a plan view of the camera module according to the embodiment shown in FIG. 2, and FIG. 13B is a cross-sectional view taken along line A4-A4' of the camera module according to the embodiment shown in FIG. 13A. And FIG. 13C is a bottom view of the camera module according to the embodiment described shown in FIG. 13A.

One of the technical problems of the embodiment is to provide a lens assembly, a lens driving device, and a camera module including the same, in which a zooming function can be smoothly performed even in a very small and compact camera module.

In addition, one of the technical problems of the embodiment is to provide a lens assembly, a lens driving device, and a camera module including the same that can solve the technical problem that the reliability of measuring the position of a lens moving when zooming in the camera module is lowered.

FIGS. 3A and 13B, the first lens assembly 110 and the second lens assembly 120 may be moved within a predetermined stroke area S in the case 20. For example, the stroke area S may be an area between the first end stroke S1 and the second end stroke S2. For example, referring to FIG. 13B, the stroke area S20 of the second lens assembly 120 may be about 4 μm or less, but is not limited thereto.

Referring to FIG. 13B, in the lens driving apparatus according to the embodiment, the second lens assembly 120 may be rolled on the second pin 52 and the fourth pin 54 through the second wheel 127. The second wheel 127 may include a second-first wheel to a second-fourth wheel 127a, 127b, 127c, and 127d.

For example, the second housing 122 of the second lens assembly 120 may include a fourth driving unit 126 that is a magnet driving unit, and may include a first sensing magnet 128 on one side.

The second lens assembly 120 may move to an end S1 opposite to the optical axis by rolling. Through this, the first sensing magnet 128 may be moved to the point S1.

In this case, the stroke area S20 of the second lens assembly 120 can be about 4 μm or less, but is not limited thereto.

The embodiment may include a first position sensor 118 under the case 20, and the first sensing magnet 128 and the first position sensor 118 of the second lens assembly 120 can be vertically n overlapped. For example, the first position sensor 118 may include a first-first position sensor 411 and a first-second position sensor 412. The first-first position sensor 411 and the first sensing magnet 128 may be vertically overlapped at the second end position S2. And the first-second position sensor 412 and the first sensing magnet 128 may be vertically overlapped at the first end position S1.

Through this, according to the embodiment, there is an effect of improving the reliability of measuring the position of the moving lens when zooming in the camera module.

For example, according to the embodiment, the first position sensor 118 and the first sensing magnet 128, which is a Hall sensor, are disposed in one stroke section, while overlapping or adjoining each other up and down in the stroke section. By installing, it is possible to improve the linearity of data reliability according to the location by securing reliable location data at both ends of the stroke section.

In addition, according to the embodiment, the first position sensor 118 is positioned on one side of the lower side of the case 20, and the first sensing magnet 128 is also disposed on one side of the second lens assembly 120 to provide a stroke section on the other side. It is possible to implement a compact camera module by reducing the area occupied by the position sensor in.

Accordingly, according to the embodiment, there is a technical effect that the zooming function can be smoothly performed even in a compact camera module.

FIGS. 13B and 13C, the embodiment minimizes the circuit board 107 area by mounting the first position sensor 118 and the hall sensor, which is the first sensing magnet 128, in one stroke section. Accordingly, since the circuit board 107 does not need to be located under the lens portion, which has the greatest influence on the thickness dimension of the camera module product, there is an effect of reducing the thickness of the camera module, and thus a compact camera module can be implemented.

EXPLANATION OF REFERENCE first lens assembly 110, second lens assembly 120, third lens group 130,
prism 140, first driving unit 310, second driving unit 320, pin 50, image sensor unit 210

INDUSTRIAL APPLICABILITY

The lens assembly, the lens driving device, and the camera module including the same according to the embodiment have a technical effect capable of solving the problem of generating a friction torque during zooming.

For example, according to the embodiment, there are technical effects such as improvement of driving force, reduction of power consumption, and improvement of control characteristics by inhibiting occurrence of friction torque during zooming.

In addition, according to the embodiment, there is a technical effect of solving the problem of occurrence of lens decenter or lens tilt during zooming.

For example, according to the embodiment, when zooming, the tolerance of the moving contact part is significantly reduced, thereby minimizing friction torque, while inhibiting the occurrence of lens decent or lens tilt, significantly improving image quality or resolution.

In addition, according to the embodiment, there is a technical effect that the zooming function can be smoothly performed even in a compact camera module. For example, according to an embodiment, a compact camera module can be implemented by arranging a position sensor and a hall sensor in one stroke section to reduce an area occupied by the position sensor.

In addition, according to the embodiment, since the position sensor and the hall sensor are mounted in one stroke section, the circuit board area can be minimized. Accordingly, since the circuit board does not have to be located under the lens part, which has the greatest influence on the thickness dimension of the camera module product, there is an effect of reducing the thickness of the camera module, thereby implementing a compact camera module.

In addition, according to the embodiment, there is an effect of improving the reliability of measuring the position of a lens moving when zooming in the camera module. For example, according to the embodiment, the position sensor and the Hall sensor are arranged to overlap or be adjacent to each other between the top and bottom in the stroke section while placing the position sensor and the hall sensor in one stroke section. By securing reliable location data, it is possible to improve the linearity of data reliability according to location.

Features, structures, effects, and the like described in the above embodiments are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, contents related to such combinations and modifications should be interpreted as being included in the scope of the embodiments.

Although the embodiments have been described above, these are only examples and are not intended to limit the embodiments, and those of ordinary skill in the field to which the embodiments belong are not departing from the essential characteristics of the embodiments. It will be seen that branch transformation and application are possible. For example, each component specifically shown in the embodiment can be modified and implemented. And differences related to these modifications and applications should be construed as being included in the scope of the embodiments set in the appended claims.

The invention claimed is:

1. A lens driving device comprising:
a base;
a first lens assembly and a second lens assembly disposed in the base and configured to move in an optical axis direction;
a first driving unit configured to drive the first lens assembly;
a second driving unit configured to drive the second lens assembly;
wherein the first lens assembly comprises a first lens barrel and a first extension portion extending from the first lens barrel in the optical axis direction and configured to overlap the second lens assembly in a first direction perpendicular to the optical axis direction, wherein the first driving unit comprises a first magnet disposed on the first lens assembly; and a first coil disposed to face the first magnet, and wherein the first magnet is configured to overlap the first extension portion in the first direction.

2. The lens driving device according to claim 1, comprising:
a first rolling unit disposed between the base and the first lens assembly; and
a second rolling unit disposed between the base and the second lens assembly.

3. The lens driving device according to claim 2, wherein the first lens assembly comprises a first recess and a second recess spaced apart in the optical axis direction.

4. The lens driving device according to claim 3, wherein the first rolling unit comprises a first-first rolling unit disposed in the first recess and a first-second rolling unit disposed in the second recess.

5. The lens driving device according to claim 4, wherein the first-second rolling unit is configured to overlap the first extension portion in the first direction.

6. The lens driving device according to claim 5, wherein the first-first rolling unit is not configured to overlap the first extension portion in the first direction.

7. The lens driving device according to claim 4, wherein the first-first rolling unit and the first-second rolling unit do not overlap the first magnet in the optical axis direction.

8. The lens driving device according to claim 4, wherein the second recess is disposed in the first extension portion, and
wherein the first recess is not disposed in the first extension portion.

9. The lens driving device according to claim 4, wherein the first magnet is configured to overlap an area between the first recess and the second recess in a second direction perpendicular to both the optical axis direction and the first direction.

10. The lens driving device according to claim 4, wherein a minimum gap between the first recess and the second recess is smaller than a length of the first magnet in the optical axis direction.

11. The lens driving device according to claim 3, wherein the first recess and the second recess are disposed on one side of the first lens assembly, and the first magnet is disposed on another side of the first lens assembly different from the one side of the first lens assembly on which the first recess and the second recess are disposed.

12. The lens driving device according to claim 1, wherein the second lens assembly comprises a second lens barrel and a second extension portion extending from the second lens barrel in the optical axis direction and configured to overlap the first lens assembly in the first direction.

13. A lens driving device comprising:
a base;
a first lens assembly and a second lens assembly disposed in the base and configured to move in an optical axis direction;
a first driving unit configured to drive the first lens assembly;
a second driving unit configured to drive the second lens assembly;
wherein the first lens assembly comprises a first lens barrel and a first extension portion extending from the first lens barrel in the optical axis direction and configured to overlap the second lens assembly in a first direction perpendicular to the optical axis direction,
wherein the first lens assembly comprises a first recess and a second recess spaced apart in the optical axis direction,
wherein the first driving unit comprises a first magnet disposed on the first lens assembly; and a first coil disposed to face the first magnet, and
wherein the first magnet is configured to overlap an area between the first recess and the second recess in a second direction perpendicular to both the optical axis direction and the first direction.

14. The lens driving device according to claim 13, wherein the first magnet is configured to overlap the first extension portion in the first direction.

15. The lens driving device according to claim 13, wherein the second lens assembly comprises a second lens barrel and a second extension portion extending from the second lens barrel in the optical axis direction and configured to overlap the first lens assembly in the first direction.

16. The lens driving device according to claim 13, comprising:
a first rolling unit disposed between the base and the first lens assembly; and
a second rolling unit disposed between the base and the second lens assembly.

17. The lens driving device according to claim 16, wherein the first rolling unit comprises a first-first rolling unit disposed in the first recess and a first-second rolling unit disposed in the second recess.

18. The lens driving device according to claim 17, wherein the first-second rolling unit is configured to overlap the first extension portion.

19. The lens driving device according to claim 13, wherein the first recess and the second recess are disposed on one side of the first lens assembly, and the first magnet is disposed on another side of the first lens assembly different from the one side of the first lens assembly on which the first recess and the second recess are disposed.

20. The lens driving device according to claim 13, wherein a minimum gap between the first recess and the second recess is smaller than a length of the first magnet in the optical axis direction.

* * * * *